(12) United States Patent
Suehiro et al.

(10) Patent No.: US 6,582,181 B2
(45) Date of Patent: Jun. 24, 2003

(54) VEHICLE SEAT

(75) Inventors: Yoshiro Suehiro, Kokubu (JP); Masamitsu Iwatani, Kariya (JP); Takafumi Hijikata, Kariya (JP); Kenji Murabayashi, Kariya (JP); Mineki Ninomiya, Kariya (JP); Yoshiyuki Miura, Kariya (JP); Tomoyuki Kuroda, Kariya (JP); Takeshi Toda, Kariya (JP); Shigeyuki Matsunaga, Gifu-ken (JP)

(73) Assignees: Toyota Shatai Kabushiki Kaisha, Kariya (JP); Kabushiki Kaisha Matsunaga Seisakusho, Gifu-ken (JP)

( * ) Notice: Subject to any disclaimer, the term of this patent is extended or adjusted under 35 U.S.C. 154(b) by 0 days.

(21) Appl. No.: 10/100,644

(22) Filed: Mar. 19, 2002

(65) Prior Publication Data

US 2002/0094262 A1 Jul. 18, 2002

Related U.S. Application Data

(62) Division of application No. 09/414,056, filed on Oct. 7, 1999, now Pat. No. 6,416,272.

(30) Foreign Application Priority Data

| Oct. 9, 1998 | (JP) | 10-288198 |
|---|---|---|
| Oct. 20, 1998 | (JP) | 10-298789 |
| Oct. 23, 1998 | (JP) | 10-302557 |
| Oct. 28, 1998 | (JP) | 10-307331 |
| Oct. 28, 1998 | (JP) | 10-307347 |
| Mar. 17, 1999 | (JP) | 11-072379 |
| Apr. 22, 1999 | (JP) | 11-115074 |

(51) Int. Cl.[7] ............................................. A61G 3/08
(52) U.S. Cl. ................... 414/812; 280/643; 296/65.04; 414/921
(58) Field of Search ................ 414/812, 921; 280/643; 296/65.04, 69

(56) References Cited

U.S. PATENT DOCUMENTS

RE19,078 E * 2/1934 Barclay 2,290,464 A 7/1942 Buchheit
2,587,679 A 3/1952 Atkinson (List continued on next page.)

FOREIGN PATENT DOCUMENTS

| DE | 2655916 C2 | 7/1977 |
|---|---|---|
| EP | 0 656 277 A1 | 11/1994 |
| FR | 2 495 451 | 12/1980 |
| FR | 2 699 129 | 6/1994 |
| GB | 2069969 | * 3/1981 |

(List continued on next page.)

OTHER PUBLICATIONS

International Search Report (PCT/JP98/03872) dated Oct. 15, 1998.
U.S. patent application No. 09/394,963; filed Sep. 10, 1999; entitled "Rotating Vehicle Seat"; Specification and drawings 71 pages.
Office Action issued from the Australian Patent Office dated Dec. 24, 1999.

(List continued on next page.)

Primary Examiner—James W. Keenan
(74) Attorney, Agent, or Firm—Patterson, Thuente, Skaar & Christensen, P.A.

(57) ABSTRACT

A lift-up mechanism (50, 150) installed inside a vehicle serves to move a seat unit (10, 110) into or out of the vehicle. The seat unit (10, 110) is used as a passenger seat inside the vehicle and as a wheelchair outside the vehicle. Connecting plates (56, 156) are disposed on the lift-up mechanism (50, 150) permit the lift-up mechanism (50, 150) to be connected to the seat unit (10, 110) by inserting the connecting plates into connecting recesses (40, 140) formed in the seat unit (10, 110). Front wheels (60, 160) and rear wheels (70, 170) of the seat unit (10, 110) can be retracted and extended. A drive unit having an electric motor or similar drive may be provided to retract and extend the front wheels (60, 160) and the rear wheels (70, 170). An attitude changing arrangement may be provided to automatically change the attitude of the front wheels (60, 160) when the front wheels (60, 160) and the rear wheels (70, 170) are retracted.

27 Claims, 25 Drawing Sheets

U.S. PATENT DOCUMENTS

| | | | | |
|---|---|---|---|---|
| 2,822,858 | A | | 2/1958 | Mussler |
| 3,865,427 | A | * | 2/1975 | Delany ........................ 280/30 |
| 4,155,587 | A | * | 5/1979 | Mitchell .................. 296/65.12 |
| 4,170,368 | A | * | 10/1979 | Southward et al. ...... 280/250.1 |
| 4,354,791 | A | * | 10/1982 | Antonellis ............... 280/304.1 |
| 4,457,663 | A | * | 7/1984 | Hems et al. ............. 280/304.1 |
| 4,483,653 | A | * | 11/1984 | Waite ...................... 280/250.1 |
| 4,632,409 | A | * | 12/1986 | Hall et al. .................... 280/30 |
| 4,733,903 | A | * | 3/1988 | Bailey ..................... 296/65.07 |
| 4,989,888 | A | | 2/1991 | Qureshi et al. |
| 5,094,420 | A | | 3/1992 | Aihara et al. |
| 5,110,173 | A | * | 5/1992 | Megna .................... 296/65.04 |
| 5,149,113 | A | * | 9/1992 | Alldredge .................... 280/30 |
| 5,261,779 | A | | 11/1993 | Goodrich |
| 5,466,111 | A | * | 11/1995 | Meyer ..................... 280/250.1 |
| 5,524,952 | A | * | 6/1996 | Czech et al. ............. 296/65.12 |
| 5,636,884 | A | | 6/1997 | Ladetto et al. |
| 5,651,576 | A | | 7/1997 | Wallace |
| 5,674,041 | A | * | 10/1997 | Smith, Jr. et al. ........ 280/250.1 |
| 5,720,462 | A | | 2/1998 | Brodersen |
| 5,769,480 | A | * | 6/1998 | Gebhardt ................. 296/65.12 |
| 5,890,764 | A | | 4/1999 | Lee |
| 6,024,398 | A | * | 2/2000 | Horton et al. ........... 296/65.07 |

FOREIGN PATENT DOCUMENTS

| | | | |
|---|---|---|---|
| JP | 53-19954 | | 2/1978 |
| JP | 57-22922 | | 2/1982 |
| JP | 57-22925 | | 2/1982 |
| JP | 58-164825 | | 11/1983 |
| JP | 60-92752 | | 5/1985 |
| JP | 62-43330 | | 2/1987 |
| JP | 62-76036 | | 5/1987 |
| JP | 62-173343 | | 7/1987 |
| JP | 62-283027 | | 12/1987 |
| JP | 62-295660 | | 12/1987 |
| JP | 62-176752 | | 7/1988 |
| JP | 1-266031 | | 10/1989 |
| JP | 3-71932 | | 7/1991 |
| JP | 5-5551 | | 1/1993 |
| JP | 5-28740 | | 4/1993 |
| JP | 5-85239 | * | 4/1993 |
| JP | 5-40027 | | 5/1993 |
| JP | 5-56581 | | 7/1993 |
| JP | 5-305112 | | 11/1993 |
| JP | 593966 | | 12/1993 |
| JP | 6-895 | | 1/1994 |
| JP | 6-27298 | | 4/1994 |
| JP | 6-63426 | | 9/1994 |
| JP | 6-262971 | | 9/1994 |
| JP | 7-4149 | | 1/1995 |
| JP | 7-323767 | | 12/1995 |
| JP | 8-300988 | | 11/1996 |
| JP | 9-48271 | | 2/1997 |
| JP | 9 86233 | | 3/1997 |
| JP | 09086233 | | 3/1997 |
| JP | 9-183325 | | 7/1997 |
| WO | WO 93/18318 | | 9/1993 |
| WO | WO 98/43849 | | 10/1998 |

OTHER PUBLICATIONS

European Search Report dated Dec. 27, 1999.

Translation of Office Action issued from Japanese Patent Office dated Mar. 28, 2000 for Application No. 10–288198.

Translation of Office Action issued from Japanese Patent Office dated Mar. 28, 2000 for Application No. 10–298789.

Translation of Office Action issued from Japanese Patent Office dated Mar. 28, 2000 for Application No. 11–115074.

U.S. patent application No. 09/509,374; filed Oct. 10, 2000; entitled "Vehicular Turning Seat" amended from "Rotating Vehicle Seat"; Specification and drawings 178 pages.

U.S. patent application No. 09/788,884; filed Feb. 20, 2001; entitled "Rotating Vehicle Seat"; Specification and drawings 53 pages.

* cited by examiner

VEHICLE SEAT

This is a divisional application of U.S. patent application Ser. No. 09/414,056, filed Oct. 7, 1999 and now U.S. Pat. No. 6,416,272.

BACKGROUND OF THE INVENTION

1. Field of the Invention

The present invention relates to a vehicle seat, and more particularly, to a vehicle seat that is designed to also act as a wheelchair so that elderly or handicapped passengers can easily get into or out of a vehicle without getting off the wheelchair.

2. Description of the Related Art

A variety of improvements have been made to known vehicle seats to enable passengers, such as elderly or handicapped persons, to easily get into or out of a vehicle. For example, as disclosed in Japanese Laid-Open Utility Model Publication Nos. 5-40027 and 7-4149, a vehicle seat has been described in which a seat body can rotate from a position facing the front of the vehicle (hereinafter referred to as a 'first position') to a position facing a door opening (hereinafter referred to as a 'second position'). In addition, the seat body is also longitudinally movable. When the passenger gets into the vehicle using this vehicle seat, the seat body is first moved forward while being rotated from the first position to the second position. After the seat body has been rotated to the second position, the passenger can sit in the seat body and the seat body is then moved rearward while being rotated from the second position back to the first position. On the other hand, when the passenger gets out of the vehicle, the seat body is moved forward with the passenger sitting on the seat body while being rotated from the first position to the second position. After the seat body has been rotated to the second position, the passenger must get off the seat.

Although passengers can easily get into or out of the vehicle using such a known vehicle seat, passengers in wheelchairs will still have some difficulty in getting into and out of the vehicle, because the passenger must move from the wheelchair to the seat body and vice versa.

SUMMARY OF THE INVENTION

It is, accordingly, an object of the present invention to provide an improved vehicle seat that is designed so that even an elderly or handicapped passenger in a wheelchair can easily get into or out of the vehicle.

Preferable, a vehicle seat has a seat unit that can be used as a wheelchair outside the vehicle and as a passenger seat inside the vehicle. Moreover, a lift-up mechanism may be provided inside the vehicle in order to move the seat unit from the outside of the vehicle to the inside of the vehicle and vice versa. Such a seat does not require the passenger to change from a fixed vehicle seat inside the vehicle to a wheelchair outside the vehicle and vice versa, thereby making it easier for such a passenger to enter and exit a vehicle. In addition, various modifications of this basic inventive concept will be introduced to teach seat units that can be moved from the outside of a vehicle to the inside of the vehicle and vice versa.

Preferred vehicle seats may include a connecting recess provided in the seat unit and a connection plate provided in the lift-up mechanism. The connection plate may be inserted into the connecting recess to form a connecting unit. Thus, the lift-up mechanism can be easily and conveniently connected to the seat unit. Further, the connecting portion may be designed so as not to be visible from the outside, thereby providing an attractive appearance for the vehicle interior. More preferably, the vehicle seat may have a lock in order to lock the connection plate and the connecting recess in the connected state.

Preferred seat units for use with such vehicle seats may include a mechanism that retracts and extends front wheels and rear wheels attached to the vehicle seat. If both the front and rear wheels can be retracted or extended when either set of wheels is retracted or extended, the wheel retracting or extending operations can be simplified.

In addition or in the alternative, preferred seat units may include an electrically or otherwise powered drive to retract or extend the front and rear wheels to assist the retraction or extension of the front and rear wheels.

An attitude changing mechanism also may be provided to change the attitude of either the front wheels or the rear wheels into a horizontal position in synchronization with the retracting of the other of the front and rear wheels. The attitude of the front or rear wheels is preferably changed into a horizontal position when moving the seat unit into the vehicle interior, so that the vertical position of the seat unit inside the vehicle can be lowered.

Further, preferred seat units may include either a male prong or a female socket of a power connector. The opposite power connector can be disposed on the lift-up mechanism. The male and female portions may be automatically connected together when the lift-up mechanism is connected to the seat unit. Therefore, power cord connecting and disconnecting operations to connect or disconnect the power cord to supply power of the drive unit can be eliminated. If this aspect is implemented, a positioning device may be provided to position the lift-up mechanism and the seat unit, so that the male portion can be reliably connected to the female portion during the power supply connection operation.

Other objects, features and advantages of the present invention will be readily understood after reading the following detailed description together with the accompanying drawings and the claims.

DETAILED DESCRIPTION OF THE INVENTION

Vehicle seats are taught having a seat unit that can be used as a wheelchair outside of the vehicle and as a passenger seat inside the vehicle. A lift-up mechanism may be provided within the vehicle interior in order to move the seat unit from outside the vehicle to inside the vehicle and vice versa.

Figure 1:
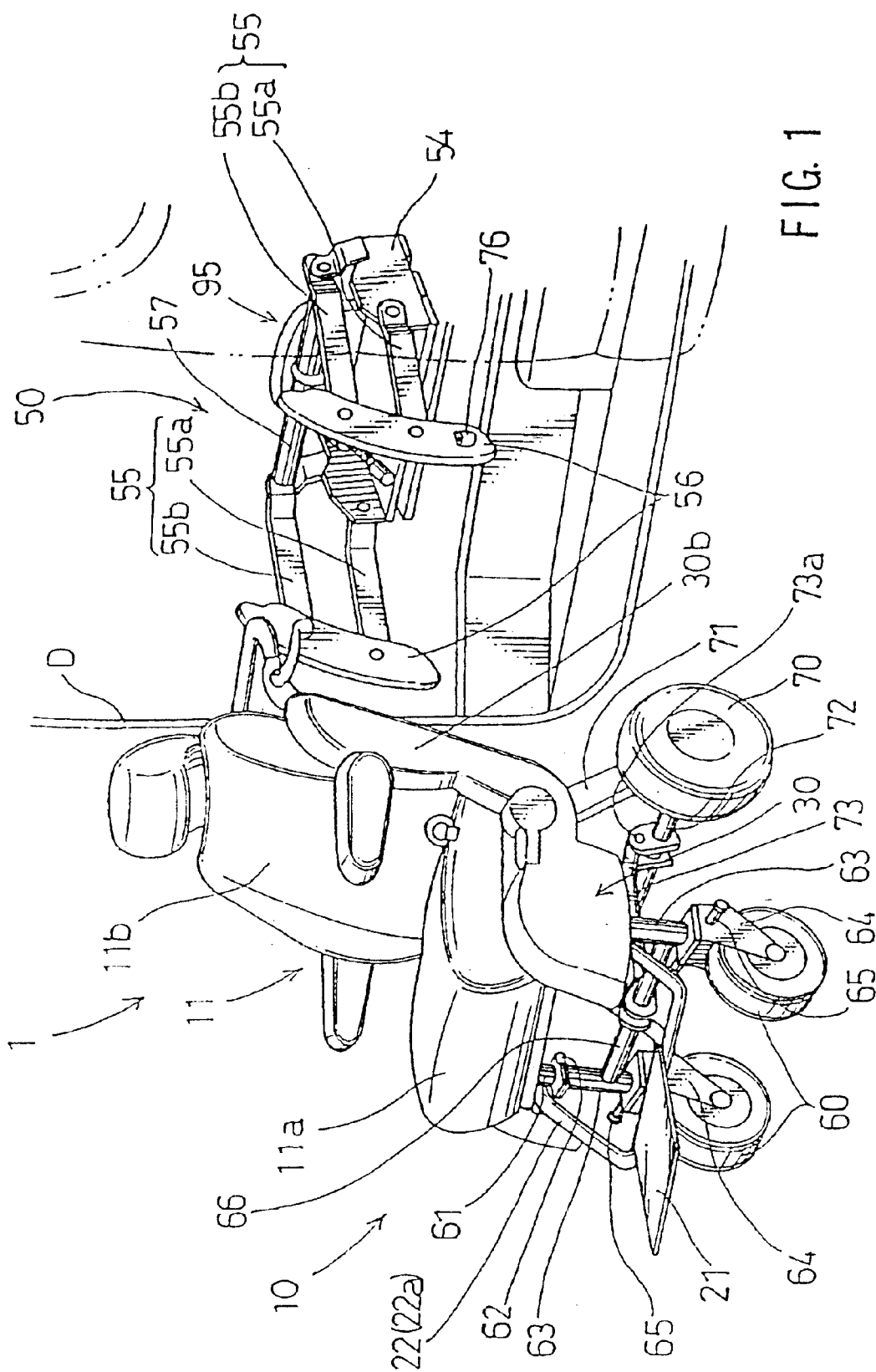
FIG. 1 is a perspective view of a vehicle seat according to a first representative embodiment, in which a seat unit is shown detached from a lift-up mechanism.

In order to move the seat unit using the lift-up mechanism, a connector can be utilized to connect the seat unit to the lift-up mechanism. In a vehicle seat 1 according to a first representative embodiment as shown in FIG. 1, the connector may include a connecting recess 40 provided in a seat unit 10 and a connecting plate 56 that can be inserted into the connecting recess 40. A catching recess 40b for receiving an upper portion 56c of the connecting plate 56 may be provided in the upper portion of the connecting recess 40. Thus, for example, when the connecting plate 56 of the lift-up mechanism 50 is inserted into the connecting recess 40 and then moved upward, the lift-up mechanism 50 is connected to the seat unit 10.

Figure 2:
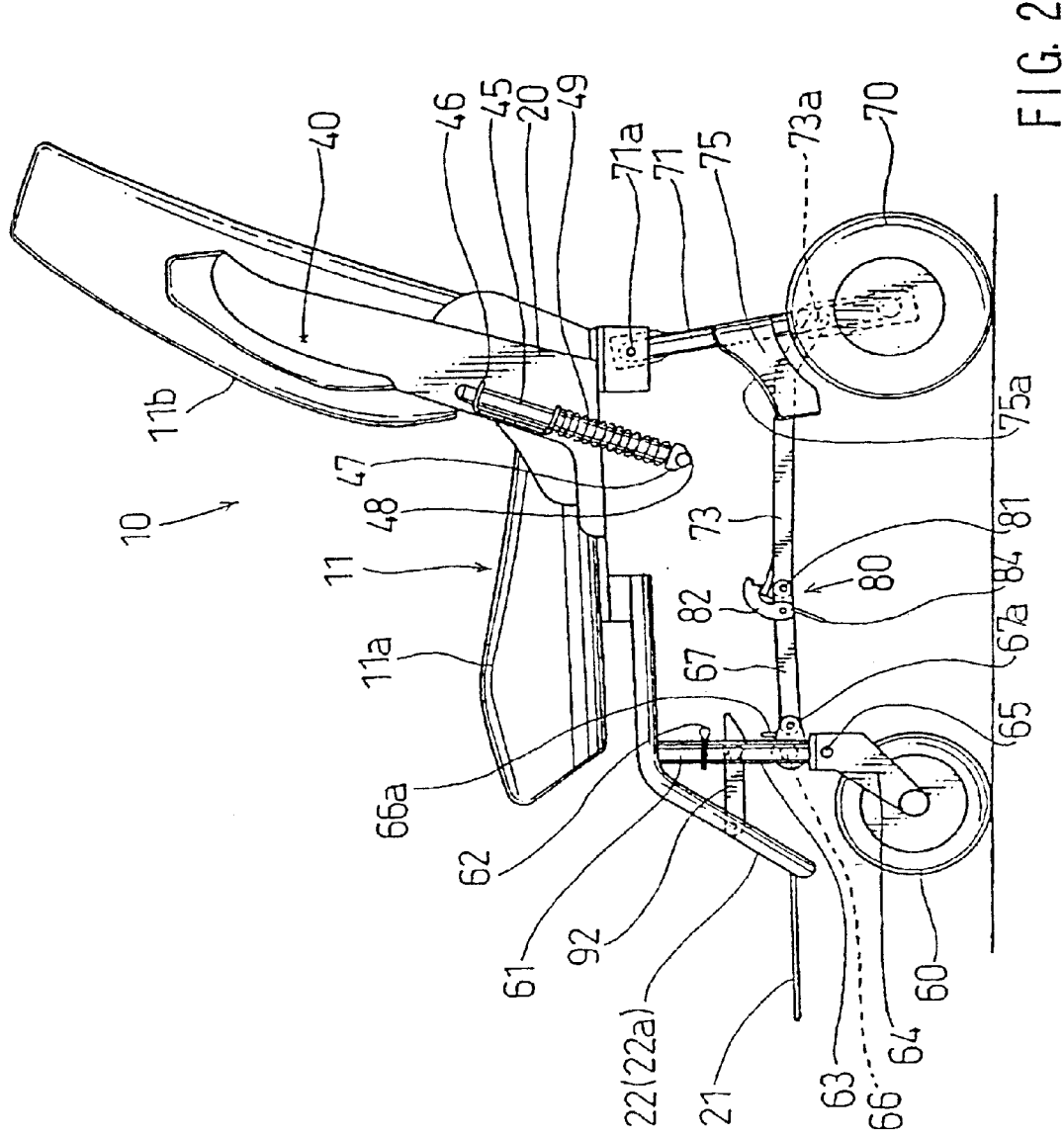
FIG. 2 is a side view of the seat unit in the first representative embodiment, showing front and rear wheels in an extended position.

As shown in FIG. 2, a lock may be provided in order to lock the lift-up mechanism 50 and the seat unit 10 in a connected state. The lock may include a lock hole 76a in the connecting plate 56 and a lock bar 45 on the seat unit 10. The lock bar 45 can move in synchronization with the retracting operation of a rear wheel 70 and can be inserted into the lock hole 76a when the rear wheel 70 is retracted into the stored position. Thus, the lock is preferably automatically operated by retracting the rear wheel 70.

Because the front and rear wheels 60 and 70 of the seat unit 10 are not needed inside the vehicle, a large space may be required inside the vehicle to accommodate the seat unit 10 with the front and rear wheels 60 and 70 held in an extended position. Therefore, the front and rear wheels 60 and 70 are preferably retractable. Preferably, the seat unit 10 in the vehicle seat 1 may have a coupling mechanism that causes the front and rear wheels 60 and 70 to retract and extend at the same time. The coupling mechanism may include a mechanism for retracting both sets of wheels if one set of wheels is retracted and a mechanism for extending both sets of wheels if one set of wheels is extended. A single mechanism may perform both operations and may include, for example, a front wheel link arm 67 pivotally connected to a connecting rod 66 that connects a pair of front wheel stays 63, and a rear wheel link arm 73 pivotally connected to the connecting rod 72 that connects a pair of rear wheel stays 71. The front wheel link arm 67 and the rear wheel link arm 73 may be interconnected to permit both parts to pivotally move together. Further, each of the front wheel stays 63 can be connected to the seat frame 20 via a hinge 62 and a retracting lock 80 can be provided to lock the front and rear wheels 60 and 70 in the extended position when the seat is being used as a wheelchair. The retracting lock 80 may function by extending the front and rear wheels 60 and 70 and may include a lock arm 82 that locks the front and rear link arms 67 and 73 in a straight relation.

In order to provide more headroom inside the vehicle, the vertical position of the seat unit is preferably lowered. In one representative embodiment that permits the vertical position of the seat unit 10 to be lowered, an attitude changing device may be utilized to automatically turn the front wheels 60 into a horizontal position. The attitude changing device may include, for example, an engagement pin 65 mounted on a bracket 64. The bracket 64 may be supported on the front wheel 60 in a manner that permits rotation around an axis of the front wheel stay 63. A stopper plate 96 can be mounted on the seat frame 20.

The front and rear wheels can be more easily retracted or extended by using an electric motor or similar drive unit to assist the movement of the front and rear wheels of the seat unit. Therefore, a seat unit 110 in the vehicle seat 101 according to a second representative embodiment may have a drive unit 186 for driving front and rear wheels 160 and 170. Further, the seat unit 110 may have a coupling mechanism to permit the front wheels 160 and the rear wheels 170 to retract and extend at the same time. The coupling mechanism may include, for example, a sliding frame 180 that is slidably mounted on the seat frame 120. A pair of front wheel link arms 193 may be connected between the sliding frame 180 and a pair of front wheel stays 191. A rear wheel link arm 174 may be connected between the sliding frame 180 and a connecting rod 172 that connects the rear wheels 170.

The seat unit 110 may also include a lock pin 145 and a lock recess 156*d* that is provided on a connecting plate 156 to accept the lock pin 145. In order to secure the insertion of the lock pin 145 into the lock recess 156*d*, a block 155*d* may be provided on a rear link arm 155*b*. The block 155*d* can be positioned adjacent to the opening of the lock recess 156*d* when the rear link arm 155*b* is rotated to an upright position when lift-up mechanism 150 is moved to lift the seat unit 110. Additionally, a lock device may include a lower front plate 144 on the seat unit 110 and a lock claw 158 provided on the connecting plate 156 for engagement with the lower front plate 144.

Further, the seat unit 110 may be designed such that power can be automatically supplied, for example, to a drive unit 186 by connecting the lift-up mechanism 150 to the seat unit 110. In one representative embodiment, a male portion 166*a* of a power connector 166 is provided on a rear frame 124 of the seat unit 110 and a female portion 166*b* of the power connector 166 is provided on a receiving frame 159 of the lift-up mechanism 150. The male portion 166*a* and the female portion 166*b* of the power connector 166 may be connected by superposing the receiving frame 159 of the lift-up mechanism 150 with the rear frame 124 of the seat unit 110 from below. In order to secure the connection between the male portion 166*a* and the female portion 166*b* of the power connector 166, a positioning device may be provided that includes a positioning pin 165 on the seat unit 110 and a positioning hole 159 on the lift-up mechanism 150. Preferably, an auxiliary positioning arrangement 260 is provided to ensure that the positioning pin 165 can be inserted into the positioning hole 159*a* even on inclined road surfaces. The auxiliary positioning arrangement 260 may include, for example, a control pin 261 mounted on the positioning pin 165 and a control block 262 mounted on the receiving frame 159 of the lift-up mechanism 150. The control block 262 can guide the control pin 261 into the positioning hole 159*a*.

Additionally, a seat connection confirmation mechanism may be provided to confirm a connection between the seat unit 110 and the lift-up mechanism 150. The seat connection confirmation mechanism may include, for example, a lift sensor 230, a seat confirmation sensor 240 and a connection confirmation sensor 250.

Each of the additional features and constructions disclosed above and below may be utilized separately or in conjunction with other features and constructions to provide improved vehicle seats and methods for designing and using such vehicle seats. Detailed representative examples of the present invention, which examples utilize many of these additional features and constructions in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will now be given with reference to the accompanying drawings.

A first detailed representative embodiment will now be explained with reference to FIGS. 1 to 14. A vehicle seat 1 has a seat unit 10 and a lift-up mechanism 50. The lift-up mechanism 50 moves the seat unit 10 from outside the vehicle to the inside the vehicle and vice versa. The seat unit 10 can be used as a passenger seat inside the vehicle and as a wheelchair outside the vehicle.

The representative seat unit 10 of FIG. 1 includes a seat body 11, a seat frame 20 and a pair of coverings 30. The seat body 11 has a seat cushion 11*a* and a seat back 11*b*. The seat frame 20 has a generally L-shaped side surface and supports the seat body 11. The coverings 30 are attached to both sides of the seat frame 20 and have generally L-shaped side surfaces. The coverings 30 are not shown in FIGS. 2 to 5 in order to avoid obstructing the view of the internal aspects of the first representative embodiment.

A footrest 21 can be mounted to the underside of the front end portion of the seat frame 20 via a U-shaped support arm 22. Front wheels 60 and rear wheels 70 are retractably mounted to the underside of the seat frame 20. In this embodiment, the front wheels 60 and rear wheels 70 are coupled with each other to permit all four wheels to be retracted and extended at the same time.

A representative support structure of the front wheels 60 and the rear wheels 70 will now be explained. A fixed post 61 is connected to and extends downward from each end portion 22*a* of the support arm 22. A front wheel stay 63 is connected to each fixed post 61 via a hinge 62, which hinge 62 permits the front wheel stay 63 to swing vertically. A bracket 64 is mounted on the lower end of the front wheel stay 63 and can rotate around an axis of the front wheel stay 63. Each front wheel 60 is supported on each bracket 64, thereby forming a "swinging caster" or "swinging wheel" that can turn laterally with respect to the lower end of the front wheel stay 63. Each front wheel 60 is positioned with respect to each bracket 64 such that the center of gravity of each front wheel 60 is offset from an axis of rotation (steering axis, caster axis) of each bracket 64 with respect to each front wheel stay 63. An engagement pin 65 is mounted on and extends laterally outward from the outside surface of each bracket 64. The engagement pin 65 serves to force the front wheel 60 into a horizontal position when the front wheel 60 is retracted.

The front wheel stays 63 are connected to each other by a connecting rod 66 and swing vertically together. Specifically, the right and left front wheels 60 are coupled together to be retracted or extended. When the front wheel stays 63 swing upward, the front wheels 60 are stored beneath the seat cushion 11 in a horizontal position by a swinging mechanism 97.

Two rear wheel stays 71 are mounted on the rear portion of the underside of the seat frame 20 via shafts 71*a* and swing vertically around the shafts 71*a*. Rear wheels 70 are mounted on the lower ends of the rear wheel stays 71 to permit rotation. The rear wheel stays 71 are connected to each other by a connecting rod 72 and swing vertically together. Specifically, the right and left rear wheels 70 are coupled with each other for retraction and extension. When the rear wheel stays 71 swing upward, the rear wheels 70 are stored in the coverings 30.

Figure 3:
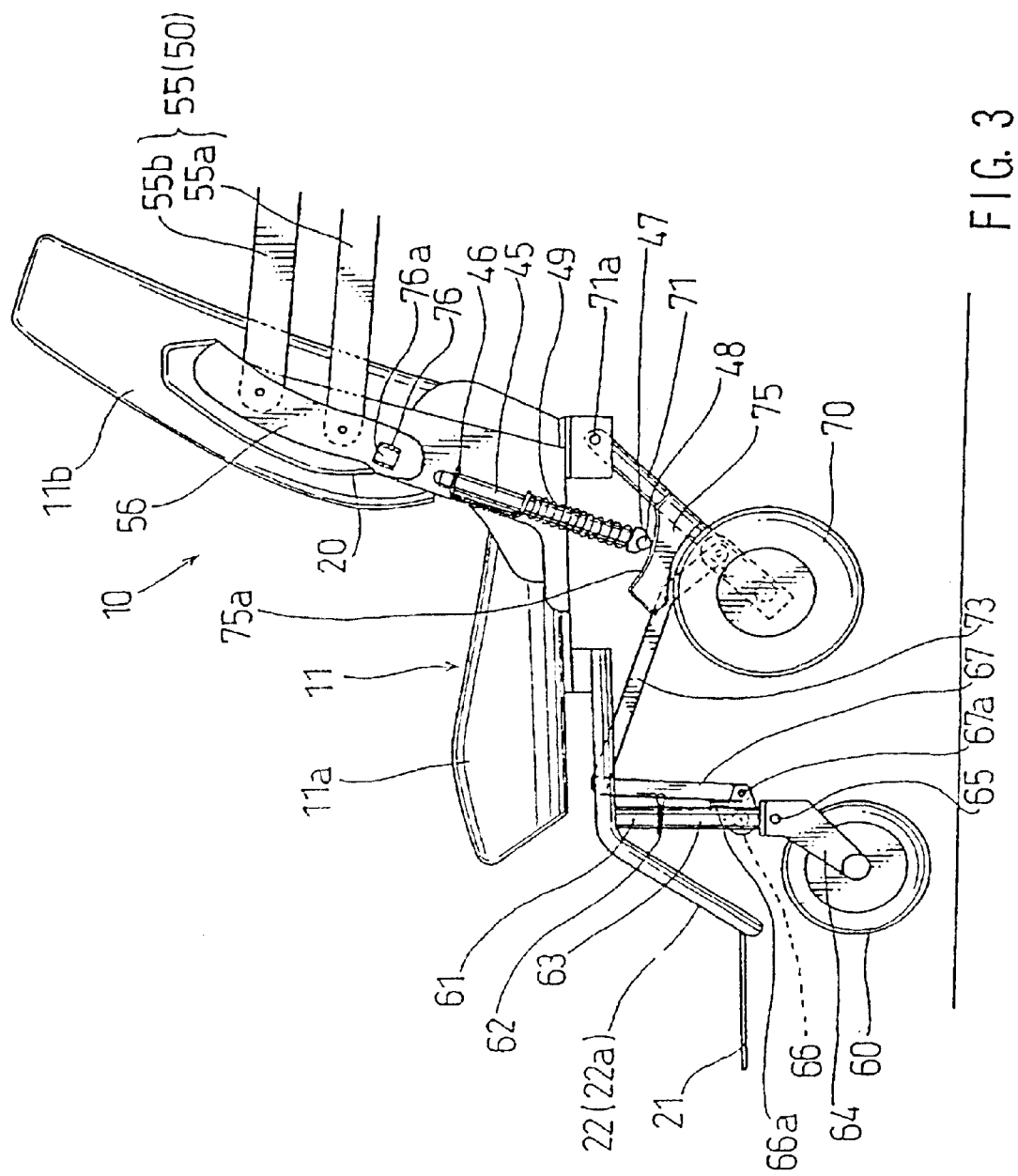
FIG. 3 is a side view of the seat unit in the first representative embodiment, showing the rear wheels rotated in a retracting direction.

A front wheel link arm 67 is connected at its front end to a medial portion in the longitudinal direction of the connecting rod 66. The front wheel link arm 67 connecting the front wheel stays 63 via a shaft 67*a* to permit vertical rotation. A stopper 66*a* is mounted on the connecting rod 66. When the front wheel link arm 67 is rotated upward by about 90° into a generally upright position, the front wheel link arm 67 contacts the stopper 66*a* (FIG. 3). Thus, the link arm 67 is restrained from further rotation. The effect of restraining rotation of the link arm 67 will be described below.

A shaft 73*a* connects the rear wheel link arm 73 to a medial portion (in the longitudinal direction) of the connecting rod 72, which is connected to the rear wheel stays 71, so as to permit vertical rotation about the rear end of the rear wheel link arm 73. The front wheel link arm 67 and the rear wheel link arm 73 are also connected by a retracting lock mechanism 80, which is shown in FIGS. 9 to 12 in detail. The rear end of the front wheel link arm 67 is connected to the front end of the rear wheel link arm 73 via a shaft 81 such that the link arms 67 and 73 can rotate vertically on the shaft 81 relative to each other. A lock arm 82 is supported on the rear end of the front wheel link arm 67 via a shaft 83 to permit vertical rotation.

Figure 9:
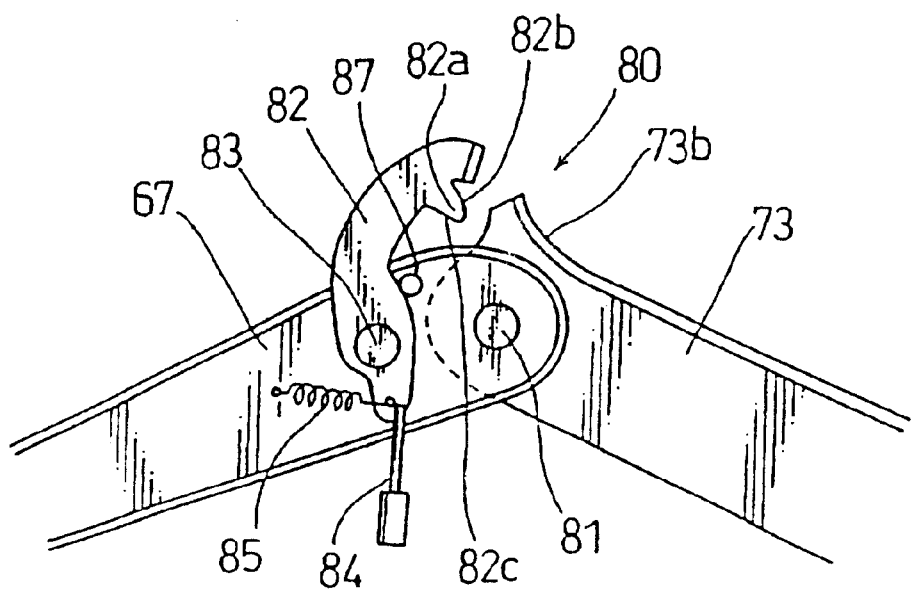
FIG. 9 is a side view of a retracting lock device shown in a released state.

A tension spring 85 urges the lock arm 82 toward a locking position (clockwise direction as shown in the drawings). As shown in FIG. 9, the lock arm 82 is restrained from rotating to the locking position by a stopper pin 87. A lever 84 is provided on the lower portion of the lock arm 82 to permit the lock to be released. A generally hook-shaped lock claw 82*a* is formed on a free end of the lock arm 82. The lock claw 82*a* has an arc-shaped portion 82*b* on the upper edge side and a straight portion 82*c* on the lower edge side. A generally L-shaped engagement edge 73*b* is formed on the front end of the rear wheel link arm 73 and extends frontward in the drawing along the upper edge of the rear wheel link arm 73.

Figure 12:
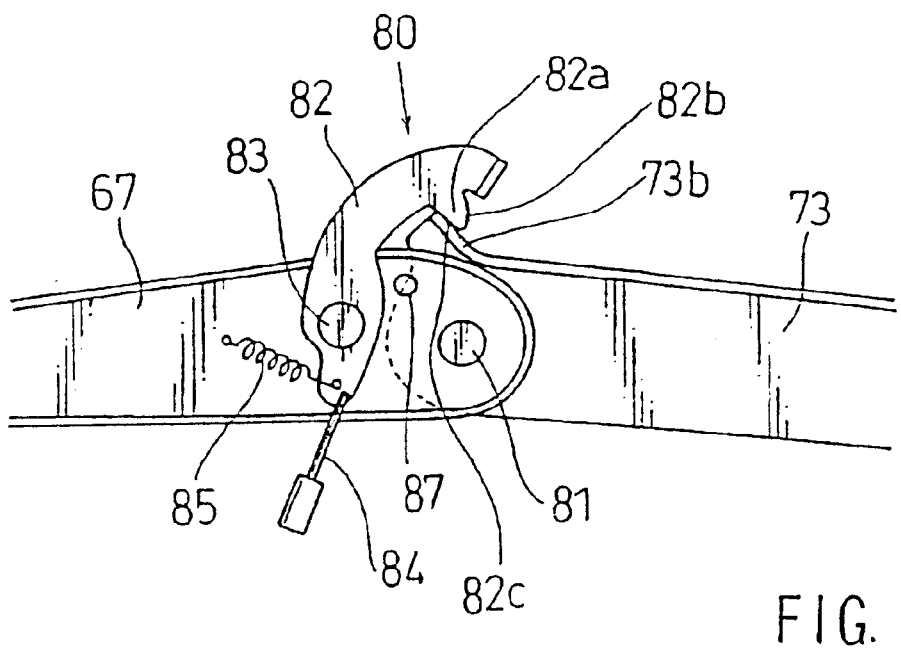
FIG. 12 is a side view of the retracting lock device shown in a locked state.

A representative lock mechanism retracting operation will now be described. As shown in FIG. 12, the link arms 67 and 73 are in a locked state, thereby locking the front wheels 60 and the rear wheels 70 in the extended state. In order to release the lock of the front and rear wheels 60 and 70, the lock release lever 84 is turned in the direction to release the lock (counterclockwise in the drawing) against the biasing force of the tension spring 85. When the lock release lever 84 is moved so as to disengage the straight portion 82*c* of the lock claw 82*a* from the engagement edge 73*b* of the rear wheel link arm 73, the front and rear wheel link arms 67 and 73 are permitted to rotate around shaft 81. When the front and rear wheel link arms 67 and 73 have rotated around the shaft 81 and the lock release lever 84 is released, as shown in FIG. 9, the biasing force of the tension spring 85 causes the lock arm 82 to contact the stopper pin 87.

Figure 10:
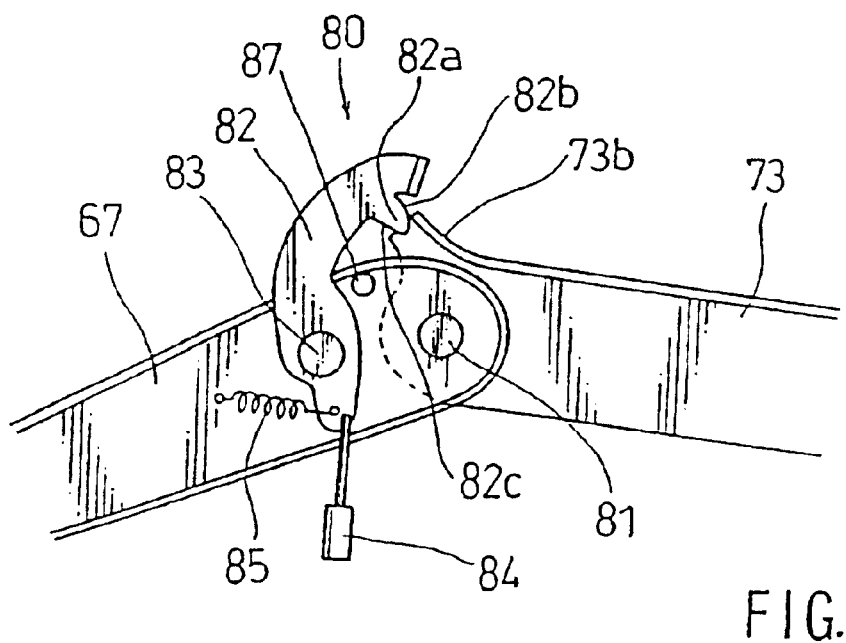
FIG. 10 is a side view of the retracting lock device, showing an engagement edge of a rear wheel link arm being engaged with an arc-shaped portion of a lock arm.
Figure 11:
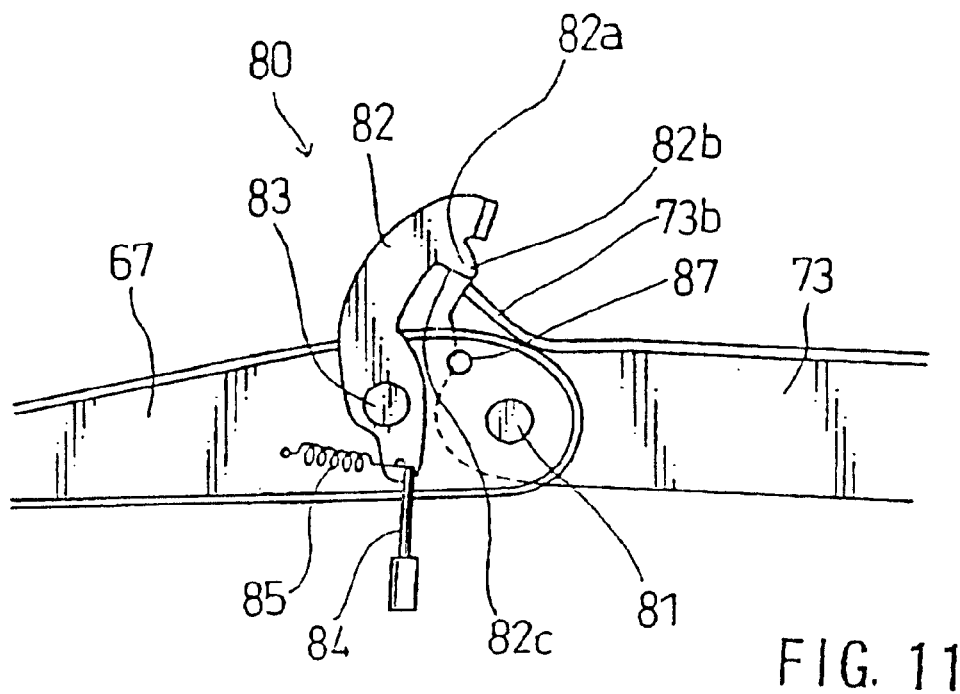
FIG. 11 is a side view of the retracting lock device, showing the engagement edge of the rear wheel link arm having passed beyond the arc-shaped portion of the lock arm.

In order to lock the front and rear wheel link arms 67 and 73 in the extended state, the front and rear wheel link arms 67 and 73 are rotated around the shaft 81 so as to open into a straight relation. During this rotation, as shown in FIG. 10, the engagement edge 73*b* of the rear wheel link arm 73 first presses the arc-shaped portion 82*b* of the lock claw 82*a* of the lock arm 82 from above. Thus, the lock arm 82 is rotated in the lock releasing direction against the biasing force of the tension spring 85, so that the lock arm 82 does not contact the stopper pin 87. When the front and rear wheel link arms 67 and 73 are further rotated into a substantially straight relation, as shown in FIG. 11, the arc-shaped portion 82*b* of the lock claw 82*a* of the lock arm 82 is disengaged from the end of the engagement edge 73*b* of the rear wheel link arm 73. Thus, the lock arm 82 is rotated in the locking direction (clockwise in the drawing) by the biasing force of the tension spring 85. As a result, as shown in FIG. 12, the straight portion 82*c* of the lock claw 82*a* moves onto and is placed on the engagement edge 73*b* of the rear wheel link arm 73. In this state, the front and rear wheel link arms 67 and 73 cannot rotate relative to each other and thus, the front and rear wheel stays 63 and 71 cannot rotate. Thus, the front wheels 60 and the rear wheels 70 are locked in the extended state.

Figure 8:
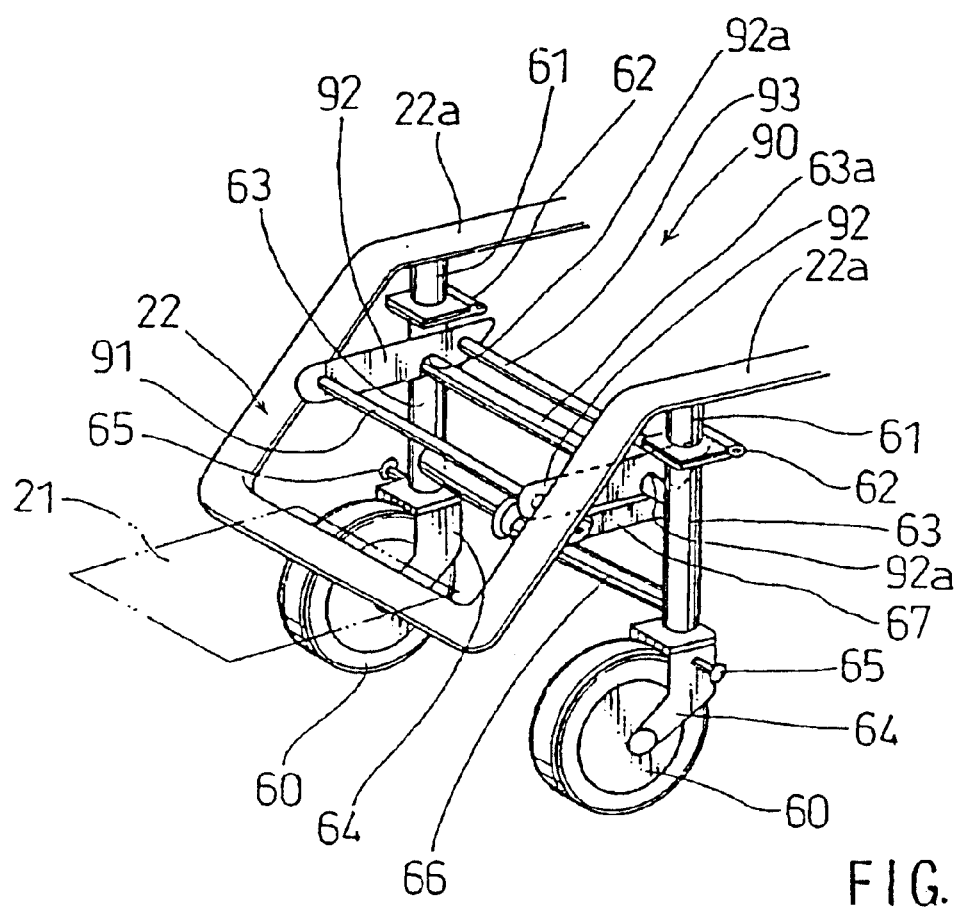
FIG. 8 is a perspective view of a front wheel extending lock mechanism.

As shown in FIG. 8, a front wheel extending lock mechanism 90 is provided on the support arm 22. A footrest 21 is attached to the support arm 22. The front wheel extending lock mechanism 90 serves to reliably lock the front wheels 60 in the extended state. Although a variety of constructions may be utilized to perform this locking function, a preferred embodiment will be described in further detail.

A pair of right and left lock arms 92 are mounted between the right and left end portions 22*a* of the support arm 22 to permit vertical rotation around a support bar 91. The lock arms 92 are spaced by a predetermined distance between the support bar 91 and a connecting bar 93 and rotate vertically in unison. Further, a downwardly opening semicircular lock recess 92*a* is formed near the rotating end of each lock arm 92. A lock bar 63*a* extends between the right and left front wheel stays 63 and can engage with the lock recesses 92*a*.

When the lock arms 92 are manually rotated downward to engage the lock bar 63*a* in the lock recesses 92*a,* the front wheel stays 63, and thus the front wheels 60, are locked in the extended state. On the other hand, when the lock arms 92 are rotated upward to disengage the lock bar 63*a* from the lock recesses 92*a,* the front wheel stays 63 are allowed to rotate upward via the hinges 62.

Figure 13:
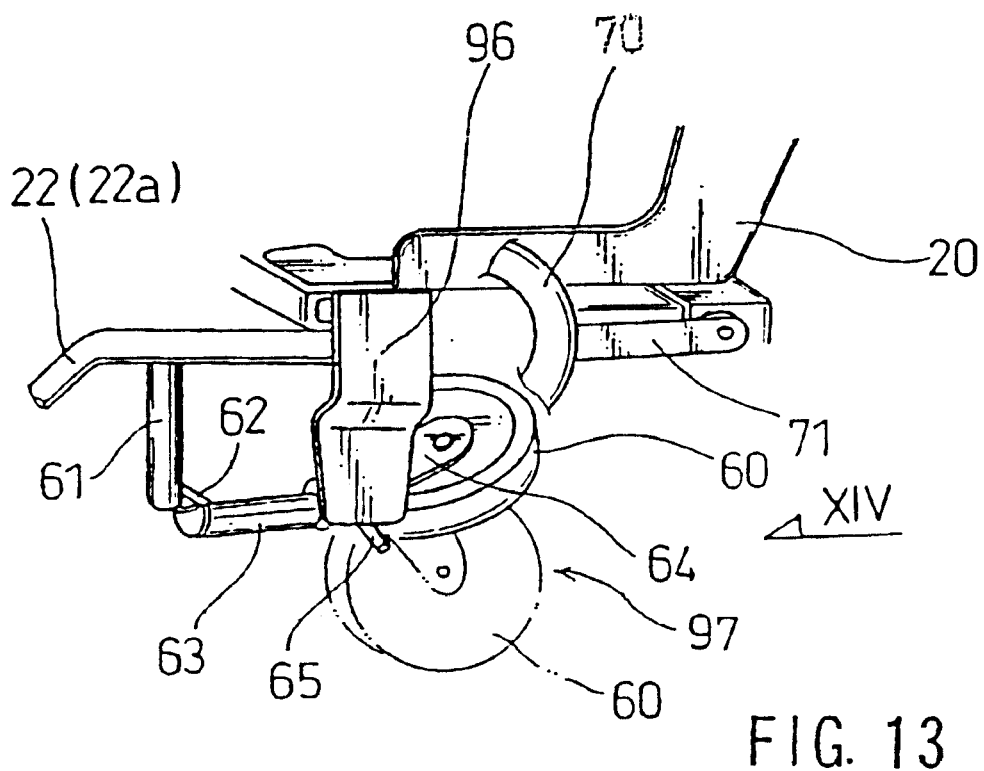
FIG. 13 is a perspective view of a front wheel swinging mechanism.
Figure 14:
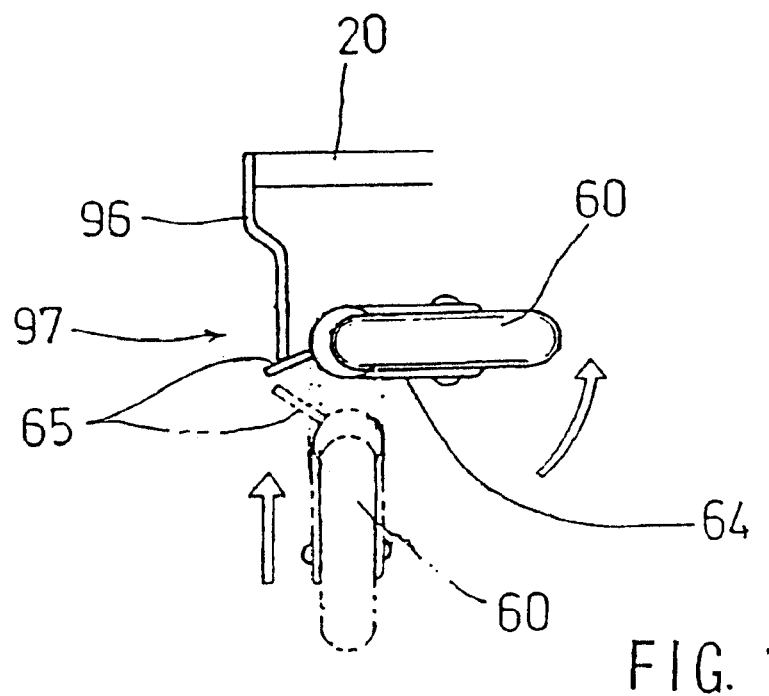
FIG. 14 is a view as seen from the direction of arrow XIV in FIG. 13.

A swinging mechanism 97 for the front wheels 60 will now be explained with reference to FIGS. 13 and 14. The brackets 64 for rotatably supporting the front wheels 60 are mounted on the lower end of the front wheel stays 63. The engagement pins 65 are mounted on the outside surface of the brackets 64 and extend laterally outwardly. A stopper plate 96 is attached to the both sides of the seat frame 20. Accordingly, the front wheels 60 are automatically turned from the vertical position to the horizontal position in synchronization with the retracting operation of the front and rear wheels 60 and 70. The operation of the swinging mechanism 97 will be described below.

Figure 6:
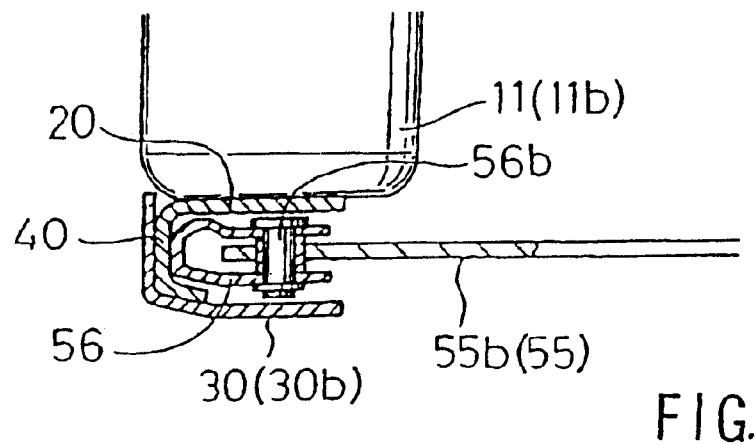
FIG. 6 is a cross-sectional view, showing a connecting plate inserted into a connecting recess.

Each of the right and left coverings 30 has an upright portion 30*b* along the sides of the seat back 11*b,* as shown in FIG. 1. A connecting recess 40 for receiving a connecting plate 56 of the lift-up mechanism 50 may be defined within each upright portion 30*b*. The interior construction of the representative covering 30 is shown in FIGS. 6 and 7.

The connecting recess 40 is defined along the seat frame 20 and has a vertically elongated curved configuration having a U-shaped cross section that is open to the rear. A bent portion 40*a* is formed on the upper portion of the connecting recess 40 and defines a catching recess 40*b*. The lift-up mechanism 50 is connected to the seat unit 10 by inserting the connecting plates 56 of the lift-up mechanism 50 into the connecting recesses 40. The operation of the connected seat unit 10 and lift-up mechanism 50 will be described below.

Figure 4:
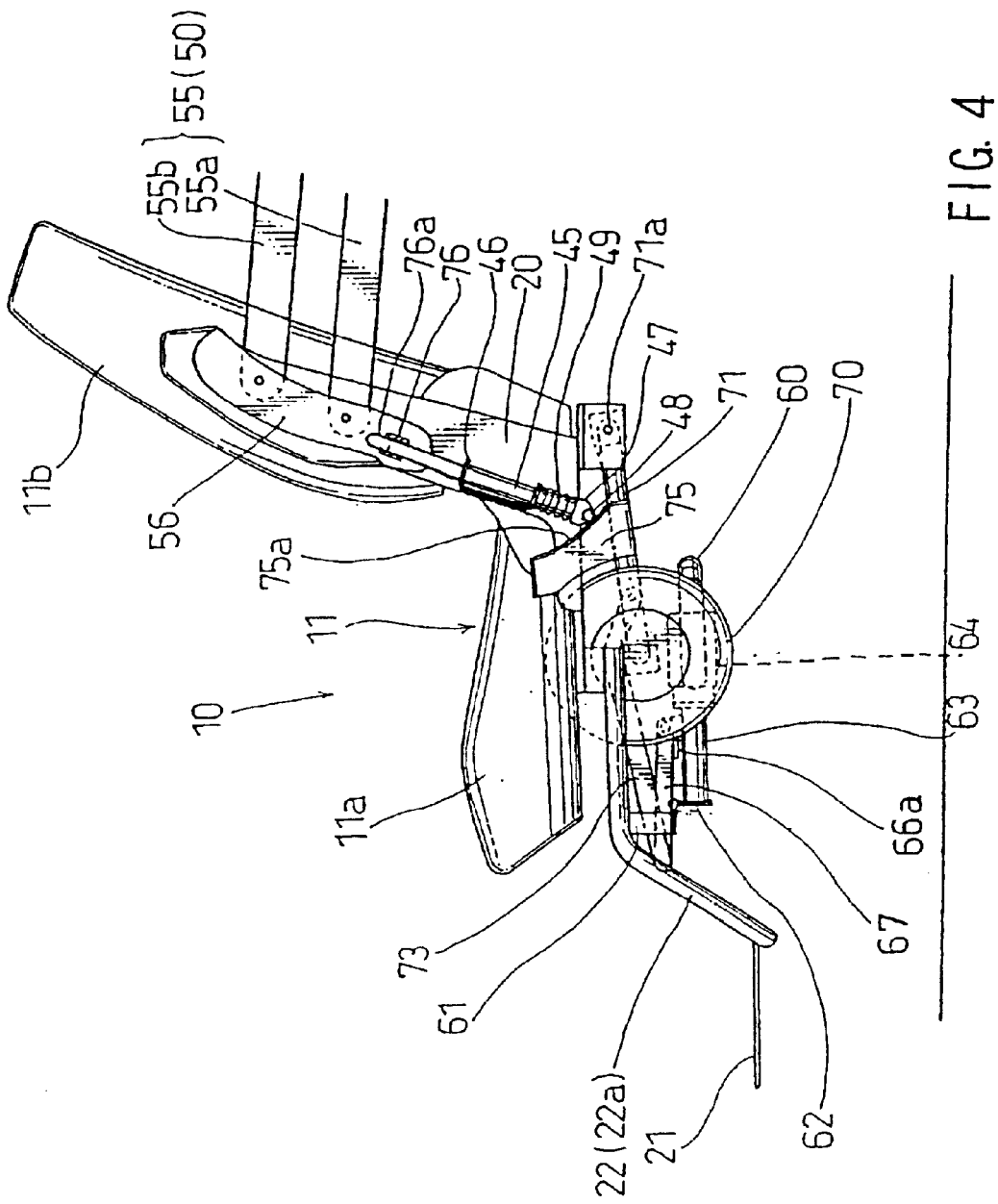
FIG. 4 is a side view of the seat unit in the first representative embodiment, showing the front and rear wheels in a retracted position.

As shown in FIGS. 2 to 4, a lock bar 45 is provided in the lower portion of each connecting recess 40 on the each side of the seat frame 20 and can locking the connection between the seat unit 10 and the lift-up mechanism 50. A retaining bracket 46 supports each of the lock bars 45 and permits vertical movement. A guide roller 48 is rotatably mounted on the lower end of each lock bar 45 via a retaining block 47. A compression spring 49 is disposed between the retaining block 47 and the retaining bracket 46 and urges the lock bar 45 downward. A cam plate 75 is mounted on each rear wheel stay 71. When the rear wheels 70 are being retracted, each of the cam plates 75 contacts the guide roller 48 mounted on the lower end of the lock bar 45 and moves the lock bar 45 upward.

Figure 5:
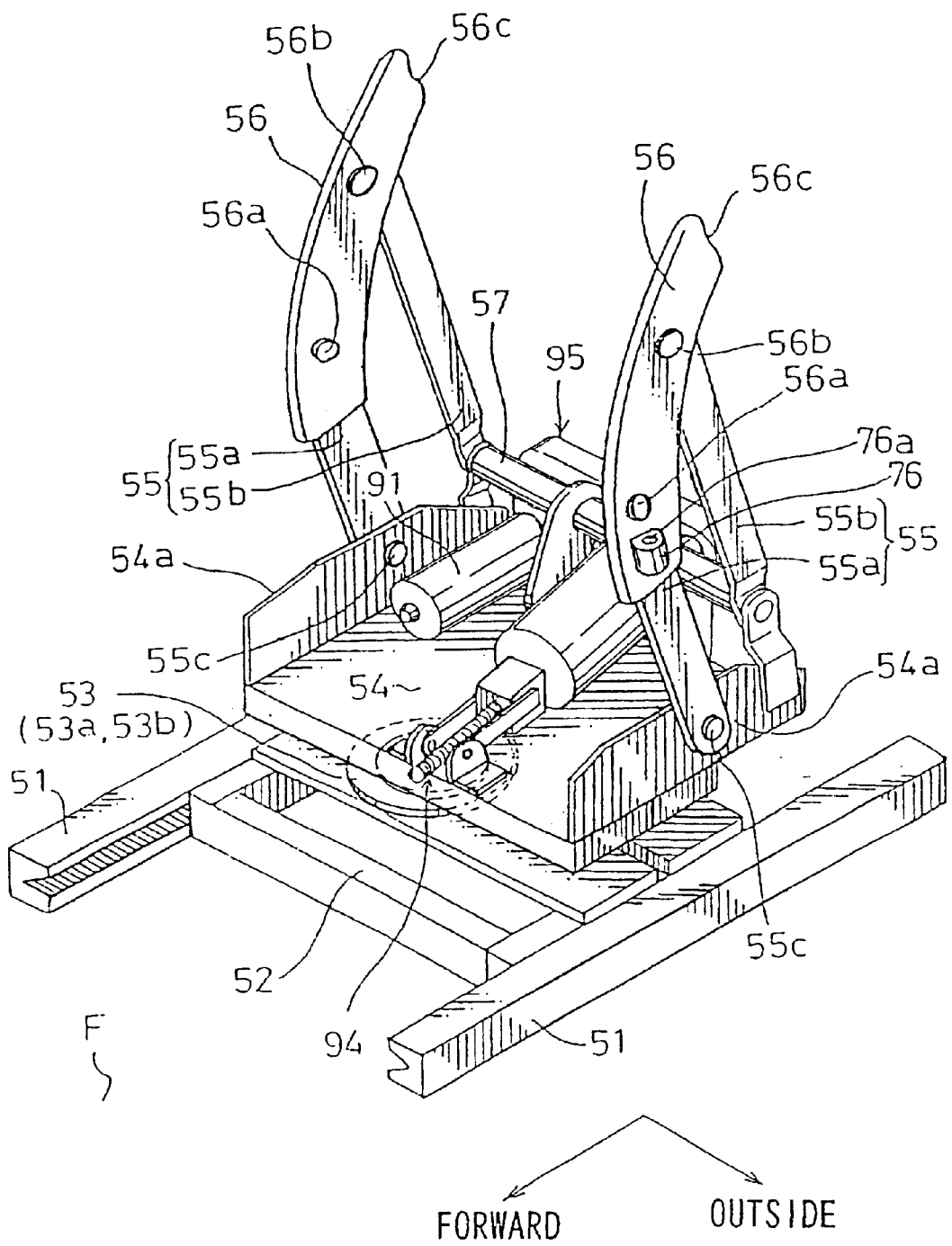
FIG. 5 is a perspective view of a lift-up mechanism of the first representative embodiment.
Figure 7:
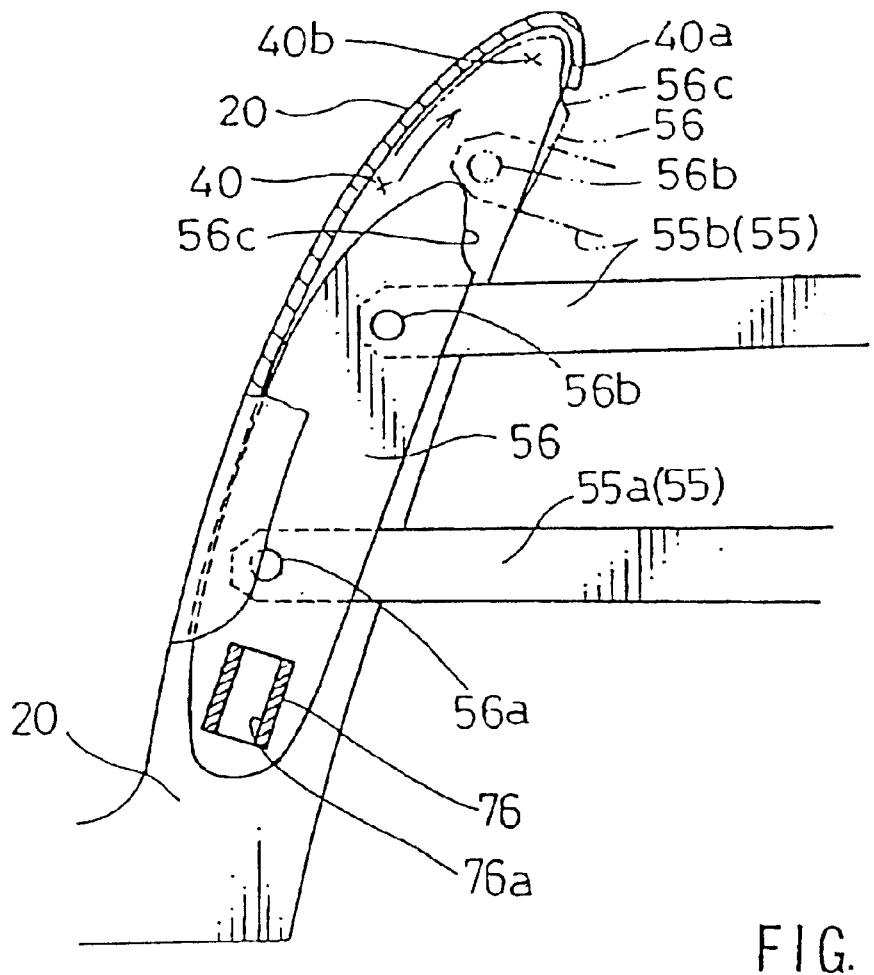
FIG. 7 is a side view showing a connecting plate inserted into a connecting recess.

As shown in FIGS. 5 and 7, a block 76 is mounted on a lower portion of each of the connecting plates 56 of the lift-up mechanism 50 and has a lock hole 76a for receiving the upper end of the lock bar 45.

As shown in FIG. 2, when the rear wheels 70 are extended by rotating the rear wheel stays 71 downward, the cam plate 75 is positioned away from the guide roller 48 of the lock bar 45. Thus, the lock bar 45 is held in the lowermost position (unlock position). In this state, when the connecting plates 56 of the lift-up mechanism 50 are inserted in the connecting recesses 40 and then moved slightly upward, upper portions 56c of the connecting plates 56 are inserted into the catching recesses 40b. Thus, the upper portions 56c of the connecting plates 56 are connected to the seat unit 10.

When the connecting plates 56 are further moved upward while the upper portions 56c of the connecting plates 56 are inserted into the catching recesses 40b, the seat unit 10 is raised. In this state, when the rear wheel stays 71 are rotated in the storage direction (upward), the cam plate 75 mounted on each rear wheel stay 71 also moves upward. Then, as shown in FIG. 3, when the rear wheel stays 71 are rotated, for example by about 45°, the guide roller 48 contacts a cam surface 75a of the cam plate 75. When the rear wheel stays 71 are further rotated upward, the guide roller 48, and thus the lock bar 45, are moved upward by the cam plate 75 against the biasing force of the compression spring 49.

As shown in FIG. 4, when the rear wheel stays 71 are rotated to bring the front and rear wheels 60 and 70 into the stored state, the upper end of the lock bar 45 is inserted into the lock hole 76a of the associated block 76. Thus, the lower end of each connecting plate 56 is connected to the seat unit 10. Consequently, the connecting plates 56 are securely held within the connecting recesses 40. Thereafter, as will be further described below, the seat unit 10 can be moved from the outside to a predetermined position inside the vehicle.

On the other hand, when the seat unit 10 is moved from the inside to the outside of the vehicle and then the rear wheels 70 are extended, the cam surface 75a of each cam plate 75 is moved downward. Thus, the lock bar 45 is moved downward by the biasing force of the compression spring 49. As a result, the upper end of the lock bar 45 is removed from the lock hole 76a of the block 76, thereby disengaging the lower end of the connecting plate 56 from the seat unit 10.

Thus, each lock bar 45 is moved upward or downward in synchronization with the retracting or extending operation of the front and rear wheels 60 and 70. As a result, the upper end of the lock bar 45 is inserted into or removed from the lock hole 76a of the block 76. Consequently, the connection between the lower ends of the connecting plates 56 and the seat unit 10 and thus the connection between the seat unit 10 and the lift-up mechanism 50 are automatically locked or unlocked.

The representative lift-up mechanism 50 will now be explained in further detail. As shown in FIG. 5, the representative lift-up mechanism 50 includes a main base 52, a rotary disc 53, a swing base 54, and a pair of four-joint link mechanisms 55. A pair of slide rails 51 is installed on the vehicle compartment floor F and the slide rails 51 longitudinally movably support the main base 52. The rotary disc 53 is mounted on the main base 52 and the swing base 54 is mounted on the rotary disc 53. The link mechanisms 55 are provided on the both sides of the swing base 54.

In this first representative embodiment, a drive mechanism for moving the main base 52 longitudinally with respect to the vehicle is not provided. Therefore, the main base 52 is manually moved longitudinally with respect to the vehicle. The main base 52 can be locked at a desired position in the longitudinal direction of the vehicle by a slide lock mechanism (not shown). An electrically powered drive mechanism, such as the combination of a motor and a motorized drive device, may be used to move the main base 52 longitudinally with respect to the vehicle.

An inner ring 53a and an outer ring 53b are assembled together to form the rotary disc 53 and to permit rotation with respect to each other. The outer ring 53b is fixed on the main base 52 and the inner ring 53a is fixed on the underside of the swing base 54. The swing base 54 can be rotated by the rotary disc 53 between a first position facing the front of the vehicle and a second position facing the door opening D (see FIG. 1). The swing base 54 can be locked in the first and second positions by a rotation lock mechanism (not shown).

Further, a coupling mechanism (not shown) can be provided between the swing base 54 and the vehicle floor F to couple the rotational movement and the longitudinal movement of the swing base 54. The coupling mechanism may include an arc-shaped pinion gear that is mounted on the underside of the swing base 54, an intermediate gear that is rotatably supported on the main base 52 for engagement with the pinion gear and a rack that is disposed along the slide rail 51 on the vehicle interior floor F for engagement with the intermediate gear.

Each of the four-joint link mechanisms 55 has two link arms 55a and 55b. The front link arms 55a are connected by fasteners 55c to both side walls 54a of the swing base 54 to permit vertical rotation at the lower end of the front link arms 55a. The lower ends of the rear link arms 55b are connected by a connecting shaft 57 that is mounted to permit rotation with respect to the side walls 54a of the swing base 54. Thus, when the connecting shaft 57 rotates, the link arms 55b rotate vertically with respect to the swing base 54.

A motorized drive device 95 is connected to the connecting shaft 57 and serves as a drive source for driving the link mechanisms 55. When the motorized drive device 95 is actuated, the connecting shaft 57 rotates so that the link mechanisms 55 pivot downward or upward toward an upright position. The connecting plate 56 is connected to the distal end of each link mechanism 55. The link arms 55a and 55b are rotatably connected to the connecting plate 56 via shafts 56a and 56b.

As shown in FIGS. 6 and 7, the connecting plate 56 has a generally flat plate-like shape and can be inserted into the connecting recess 40 of the seat unit 10 with a small clearance. Further, the upper portion 56c of the connecting plate 56 is shaped so as to permit insertion into the catching recess 40b of the connecting recess 40 without providing any clearance. When the upper portion 56c of the connecting plate 56 is inserted into the catching recess 40b, the upper portion 56c is connected to the seat unit 10. As described above, the block 76 is mounted on the lower portion of the outer side surface of the connecting plate 56a and has the lock hole 76a for receiving the upper end of the lock bar 45.

Representative operations for moving the seat unit 10 from the inside to the outside of the vehicle using the lift-up mechanism 50 will now be described in further detail. The following operations can be performed with the passenger sitting in the seat body 11 of the seat unit 10.

In FIG. 1 the seat unit 10 is shown as being detached from the lift-up mechanism 50. The main base 52 is shown moved forward and the four-joint link mechanisms 55 are shown in the downward rotation position. The front and rear wheels 60 and 70 of the seat unit 10 are shown extended downward in a state in which the seat unit 10 is ready for use as a normal wheelchair. Specifically, as shown in FIGS. 2 and 12, the link arms 67 and 73 are held generally in a straight relation and the straight portion 82c of the lock claw 82a of the lock arm 82 is placed on the engagement edge 73b of the rear wheel link arm 73. In this state, both the link arms 67 and 73 are locked to prevent rotation and thus, the front wheels 60 and the rear wheels 70 are locked in the extended state.

The seat unit 10 can be connected to the lift-up mechanism 50 and moved inside the vehicle by the following representative procedure. First, the seat unit 10 is placed sufficiently close to the lift-up mechanism 50 with its back toward the lift-up mechanism 50. The motorized drive device 95 is then actuated to rotate the connecting shaft 57 (for example, in a forward direction), so that the link mechanisms 55 pivot downward. The connecting plates 56 of the lift-up mechanism 50 are then inserted into the connecting recesses 40 of the seat unit 10.

The connecting shaft 57 is then rotated (for example, in a reverse direction), so that the link mechanisms 55 slightly pivot toward the upright position (toward the vehicle interior side). The upper portions 56c of the connecting plates 56 are then inserted into the catching recesses 40b of the connecting recesses 40. The connecting shaft 57 is then further rotated in the reverse rotation to move the link mechanisms 55 further toward the upright position. Thus, the seat unit 10 is lifted up above the ground and the motorized drive device 95 is stopped.

Subsequently, with the seat unit 10 lifted up above the ground, the front and rear wheels 60 and 70 are retracted. Specifically, the lock release lever 84 is operated to rotate the lock arm 82 in the lock release direction (counterclockwise in FIG. 2). Thus, the lock of the retracting lock mechanism 80 is released.

When the lock of the retracting lock mechanism 80 has been released, the front wheel link arm 67 and the rear wheel link arm 73 are allowed to rotate around the shafts 67a and 73a, respectively (see FIG. 9). In this state, as shown in FIG. 3, the rear wheel stays 71 are rotated upward around the shafts 71a to store the rear wheels 70. Thus, the front and rear wheel link arms 67 and 73 are rotated around the shaft 81 relative to each other in a direction to form an inverted V-shape. When the rear wheel stays 71 are rotated by about 45°, the front wheel link arm 67 rotates upward by about 90° into a generally upright state. At this time, the front wheel link arm 67 contacts the stopper 66a, so that the link arm 67 is restrained from further rotation around the shaft 67a. During this upward rotation of the front wheel link arm 67 of about 90°, the link arm 67 only rotates upward via the shaft 67a and thus the front wheel stays 63 and the front wheels 60 do not rotate.

After the link arms 67 and 73 have been rotated to some extent with the lock release lever 84 being moved to the lock release direction, the lock release lever 84 is released. As shown in FIG. 9, the lock release lever 84 then rotates in the locking direction by the biasing force of the tension spring 85 and is held in a position in which the lock arm 82 contacts the stopper pin 87.

As shown in FIG. 3, when the rear wheel stays 71 are rotated upward by about 45°, the cam surface 75a of the cam plate 75 on each rear wheel stay 71 contacts the guide roller 48. In this state, when the rear wheel stays 71 are further rotated upward, the guide roller 48 and thus the lock bar 45 are moved upward by the cam plate 75 against the biasing force of the compression spring 49. When the rear wheel stay 71 is further rotated, as shown in FIG. 4, the upper end of the lock bar 45 is inserted into the lock hole 76a of the block 76. Thus, the lower portion of the connecting plate 56 is securely held within the connecting recess 40, and the connecting operation of the lift-up mechanism 50 to the seat unit 10 is completed.

Further, when the front wheel link arm 67 rotates by about 90° into a generally upright state, the link arm 67 is restrained from further rotation by the stopper 66a. Therefore, when the rear wheel stays 71 are rotated upward more than about 45°, as shown in FIG. 4, the upper end of the front wheel link arm 67 is pushed forward via the shaft 81. Accordingly, the lower end of the link arm 67 is pushed rearward, and the front wheel stays 63 are rotated rearward via the hinges 62. Thus, the front wheels 60 are stored in synchronization with the storing operation of the rear wheels 70.

When the rear wheel stays 71 are rotated upward by about 90° and the rear wheels 70 are stored within the coverings 30, the front wheel stays 63 are also rotated upward about 90° and stored under the seat cushion 11a. At this time, the front wheels 60 are stored in a horizontal position will be described below. The state in which the front and rear wheels 60 and 70 have been completely retracted is shown in FIG. 4.

Additionally, although it is not specifically shown, a lock can be provided in a generally medial portion of the connecting rod 72 of the rear wheels 70, and a striker can be provided on the underside of the seat cushion 11a. The lock is adapted to engage with the striker, so that the rear wheels 70 are held in the stored position. In this case, by locking the rear wheels 70 in the stored position by the lock and the striker, the front wheels 60 are also locked in the stored position.

The swinging mechanism 97 can serve to turn the front wheels 60 from the vertical position to the horizontal position when the front wheels 60 are stored under the seat cushion 11a and its operation will now be explained with reference to FIGS. 13 and 14. When each front wheel stay 63 is rotated upward around the hinge 62, the engagement pin 65 mounted on the bracket 64 contacts the stopper plate 96 of the seat frame 20. In this state, when the front wheel stay 63 is further rotated upward, the bracket 64 rotates about the front wheel stay 63. As a result, the front wheels 60 are automatically rotated from the vertical position to the horizontal position. In these representative examples, the position in which the axis of rotation of the front wheels 60 extends horizontally will be referred to as the 'vertical position.' Further, the position in which the axis of rotation of the front wheels 60 extends vertically will be referred to as the 'horizontal position.' In FIGS. 13 and 14, a solid line depicts the front wheel 60 in the horizontal position and a broken line depicts the front wheel 60 in the vertical position.

Thus, because the front wheels 60 are stored in the forced horizontal position, the space, which is vertically occupied by the seat when the front and rear wheels 60 and 70 are in the stored position, can be reduced. Therefore, the vertical position of the seat unit 10 when installed inside the vehicle can be lowered. In fact, he seat unit 10 can preferably be installed inside the vehicle in substantially the same vertical position as other seats in the vehicle, which simplifies the vehicle interior design.

After the front and rear wheels 60 and 70 have thus been stored, the connecting shaft 57 is rotated in the reverse direction again by the motorized drive device 95 to rotate the link mechanisms 55 into the upright position. As a result, the seat unit 10 is moved above the swing base 54 and therefore, the seat unit 10 is moved inside the vehicle. The main base 52 of the lift-up mechanism 50 is then moved rearward to adjust the position of the seat unit 10 inside the vehicle. When the link mechanisms 55 are in the upright position, they are locked in position by the swing lock mechanism (not shown). Thus, the seat unit 10 is held above the swing base 54.

After the seat unit 10 has thus been moved into the vehicle compartment, the seat unit 10 and the swing base 54 are manually rotated by about 90°. Thus, the seat unit 10 is rotated to the first position so as to face the front of the vehicle. At this time, by using the coupling mechanism described above, the seat unit 10 moves longitudinally with respect to the vehicle while rotating to the first position facing the front of the vehicle. Thus, the seat unit 10 is positioned in a predetermined position in the longitudinal direction of the vehicle, while rotating to the first position.

On the other hand, by reversing the above-described procedure, the seat unit 10 can be moved from the inside to the outside of the vehicle and the seat unit can be used as a wheelchair by itself. Specifically, the seat unit 10 is moved out of the vehicle by the lift-up mechanism 50. During this operation, the rear wheel stays 71 are rotated downward and the rear wheel link arm 73 and the front wheel link arm 67 are rotated downward via the shaft 81. Thus, the front wheel stays 63 rotate downward.

Further, when the rear wheel stays 71 are rotated downward, each of the lock bars 45 is moved downward by the biasing force of the associated compression spring 49. Thus, the upper end of the lock bar 45 is removed from the lock hole 76a of the block 76, so that the connecting plate 56 is allowed to be removed from the connecting recess 40.

As shown in FIG. 3, when the rear wheel stays 71 are rotated downward by about 45°, the front wheel link arm 67 is returned into a generally upright state. As a result, the front wheel stays 63 and thus the front wheels 60 are completely extended. When the front wheels 60 are extended from the stored position, the engagement pin 65 of each bracket 64 is disengaged from the stopper plate 96. Then, due to the particular positional relationship of the gravity of center of the front wheels 60 with respect to the rotational axis of the brackets 64, the front wheels 60 are returned into the vertical position.

When the rear wheel stays 71 are extended into a generally upright state, the front and rear wheel link arms 67 and 73 are rotated into a generally straight relation. FIGS. 9 to 12 show the retracting lock mechanism 80 sequentially rotating the link arms 67 and 73 into the generally straight relation. The link arms 67 and 73 are thus locked in the generally straight relation by the retracting lock mechanism 80. Therefore, the front wheel stays 63 and thus the rear wheel stays 71 are locked in the extended position.

After the front and rear wheels 60 and 70 have thus been extended, the four-joint link mechanisms 55 of the lift-up mechanism 50 are rotated downward to place the seat unit 10 on the ground. After the seat unit 10 has been placed on the ground, the link mechanisms 55 of the lift-up mechanism 50 are further rotated downward and the connecting plates 56 are removed from the connecting recesses 40. Thus, the connection between the seat unit 10 and the lift-up mechanism 50 can be released.

Thereafter, the seat unit 10 can be used as a normal wheelchair by itself. Naturally, the link mechanisms 55 of the lift-up mechanism 50 can be rotated upward to return back to the vehicle interior position.

According to the vehicle seat 1 having the above construction, by coupling the front wheels 60 and the rear wheels 70 together, they can be retracted or extended together. Therefore, the vehicle seat is especially convenient to use, particularly for the passengers' helpers.

Further, because the front wheels 60 are automatically rotated from the vertical position into the horizontal position in synchronization with the retracting operation of the front and rear wheels 60 and 70, the seat unit 10 can be readily installed inside the vehicle substantially in the same vertical position as the other seats in the vehicle. Therefore, the passenger in the seat unit 10 can sit at the same height as the other passengers in the vehicle.

As noted above, various modifications, additions and deletions may be made to the above-described first representative embodiment. For example, the swinging mechanism 97 of the front wheels 60 is an optional feature. Further, although the connecting plates 56 have been described as being fixed by moving the lock bars 45 upward in synchronization with the retracting operation of the rear wheels 70, the mechanism for fixing the connecting plates 56 is not required to operate in synchronization with the retracting operation of the rear wheels 70. In this case, the cam plate 75 and the lock bar 45 are not necessary. Further, various other mechanisms may be utilized as a mechanism for fixing the connecting plates 56.

Moreover, the front and rear wheels 60 and 70 of the seat unit 10 have been described as being manually retracted and extended in the first representative embodiment, but an electric motor may be used to perform this operation. A vehicle seat according to a second representative embodiment will now described with reference to FIGS. 15 and 16, which vehicle seat uses an electric drive to retract and extend front and rear wheels.

Like the first representative embodiment, the vehicle seat 101 of the second representative embodiment has a seat unit 110 and a lift-up mechanism 150. The lift-up mechanism 150 moves the seat unit 110 from the outside to the inside of the vehicle and vice versa. The seat unit 110 can be used as a seat when installed in the vehicle and also as a wheelchair by itself when moved out of the vehicle and disconnected from the lift-up mechanism 150.

Figure 17:
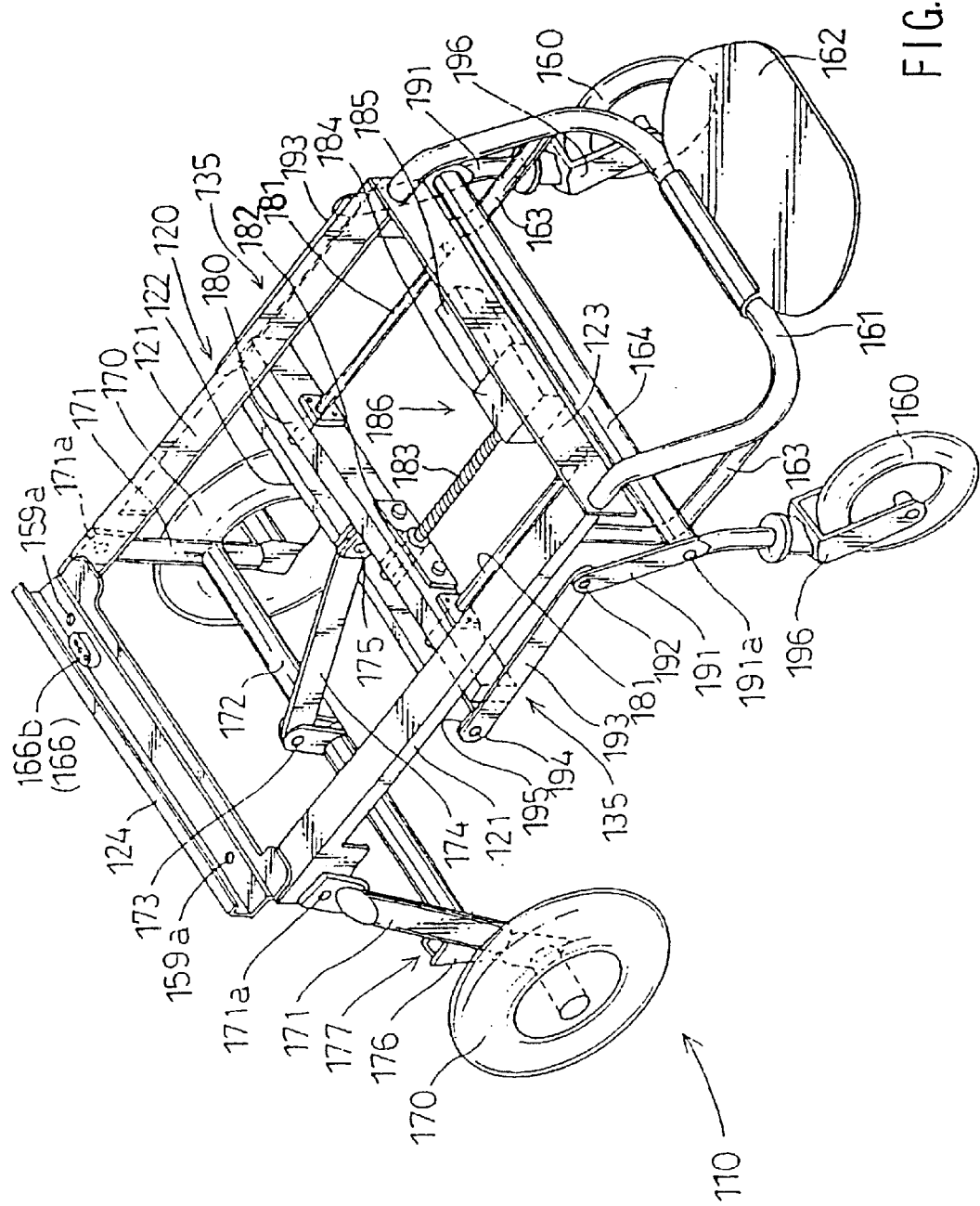
FIG. 17 is a perspective view of the seat unit in the second representative embodiment, in which a seat body is removed and not shown for illustration purpose.

The seat unit 110 includes a seat body 111, retractable front wheels 160 and rear wheels 170. The seat body 111 has a seat cushion 111a and a seat back 111b and is secured to a seat frame 120. FIG. 17 shows the seat body 111 removed from the seat unit 110 and the seat body 111 is not shown to simplify the illustration. The front wheels 160 and rear wheels 170 are attached to the seat frame 120 and are coupled to each other by a coupling mechanism 135 so as to be retracted and extended together.

Specifically, a pair of rear wheel stays 171 is supported at the upper ends of the rear wheel stays 171 on the rear portion of right and left side frames 121 of the seat frame 120 via shafts 171a. The rear wheel stays 171 swing vertically around the shafts 171a. The rear wheels 170 are rotatably mounted on the lower end of the rear wheel stays 171. The rear wheel stays 171 are connected to each other by a connecting rod 172 and swing vertically together. The rear end of a rear wheel link arm 174 is connected to a medial portion in the longitudinal direction of the connecting rod 172 via a shaft 67a to permit vertical rotation. The front end of the rear wheel link arm 174 is rotatably connected to a medial portion in the longitudinal direction of a sliding frame 180 via a shaft 175. The sliding frame 180 will be described in further detail below.

A front frame 123, a middle frame 122 and a rear frame 124 are mounted between the side frames 121 of the seat frame 120. A footrest support frame 161 is attached to the front frame 123. A footrest 162 is retractably mounted on a medial portion of the footrest support frame 161. A pair of L-shaped support frames 163 is attached to the both sides of the footrest support frame 161. A connecting rod 164 is connected between the support frames 163. The front wheel stays 191 are rotatably connected to the both ends of the connecting rod 164 via shafts 191a at a generally medial portion of the front wheel stays 191.

A fork-shaped front wheel bracket 196 is attached to the lower end of each front wheel stay 191 and can rotated around an axis of the front wheel stay 191. Each of the front wheels 160 is rotatably mounted to the front wheel bracket 196. Thus, the front wheel 160 is mounted to permit swinging movement (i.e. the axis of rotation of the front wheel 160 is horizontally rotatable with respect to the axis of the front wheel stay 191).

The front ends of a pair of front wheel link arms 193 are rotatably connected to the upper ends of the front wheel stays 191 via shafts 192. The rear ends of the front wheel link arms 193 are rotatably connected to the sliding frame 180 via shafts 194 and L-shaped brackets 195. Two parallel slide bars 181 are connected between the front frame 123 and the middle frame 122. The sliding frame 180 is mounted to permit longitudinal sliding movement with respect to the seat frame 120 via the slide bars 181.

A nut 182 is mounted on a generally medial portion of the sliding frame 180. A threaded shaft 183 is threadably inserted into the nut 182. The middle frame 122 rotatably supports the rear end of the threaded shaft 183 and the front end of the threaded shaft 183 is connected to an electric motor 185 via a gear box 184. When the motor 185 rotates in a forward or reverse direction, the threaded shaft 183 rotates in a forward or reverse direction. Thus, the sliding frame 180 moves forward or rearward by engagement between the threaded shaft 183 and the nut 182. In this embodiment, a drive unit 186 for moving the sliding frame 180 forward and rearward primarily includes the electric motor 185, threaded shaft 183 and nut 182. Naturally, other components may be utilized to implement this feature.

When the sliding frame 180 is moved forward by rotating the motor 185 in the forward direction, the front wheel link arms 193 move forward. Therefore, the front wheel stays 191 rotate around the shafts 191a to move the front wheels 160 rearward (in the clockwise direction in FIG. 17), thereby retracting the front wheels 160.

Further, when the sliding frame 180 is moved forward by rotating the motor 185 in a forward direction, the rear wheel link arm 174 also moves forward and the connecting rod 172 moves forward. Therefore, the rear wheel stays 171 rotate forward (counterclockwise in FIG. 17) around the shafts 171a, so that the rear wheels 170 are retracted forward. Hereinafter, the 'retracting direction' refers to the direction of movement of the sliding frame 180 (forward in FIG. 17), the direction of movement of the front wheel link arms 193 (forward in FIG. 17), the direction of rotation of the front wheel stays 191 (clockwise direction in FIG. 17), the direction of movement of the rear wheel link arms 174 (forward in FIG. 17) and the direction of rotation of the rear wheel stays 171 (counterclockwise direction in FIG. 17), when the motor 185 is rotated in the forward direction.

On the other hand, when the motor 185 is rotated in the reverse direction, the sliding frame 180 moves rearward and the front wheel link arms 193 also move rearward. Therefore, the front wheel stays 191 rotate counterclockwise around the shafts 191a, so that the front wheels 160 are extended downward from the retracted position. Further, when the sliding frame 180 moves rearward, the rear wheel link arm 174 rotates rearward. Therefore, the rear wheel stays 171 rotate clockwise around the shafts 171a, so that the rear wheels are moved downward from the retracted position to the extended position. Hereinafter, the 'extending direction' refers to the direction of movement or rotation of each component when the motor 185 is rotated in the reverse direction.

Figure 18:
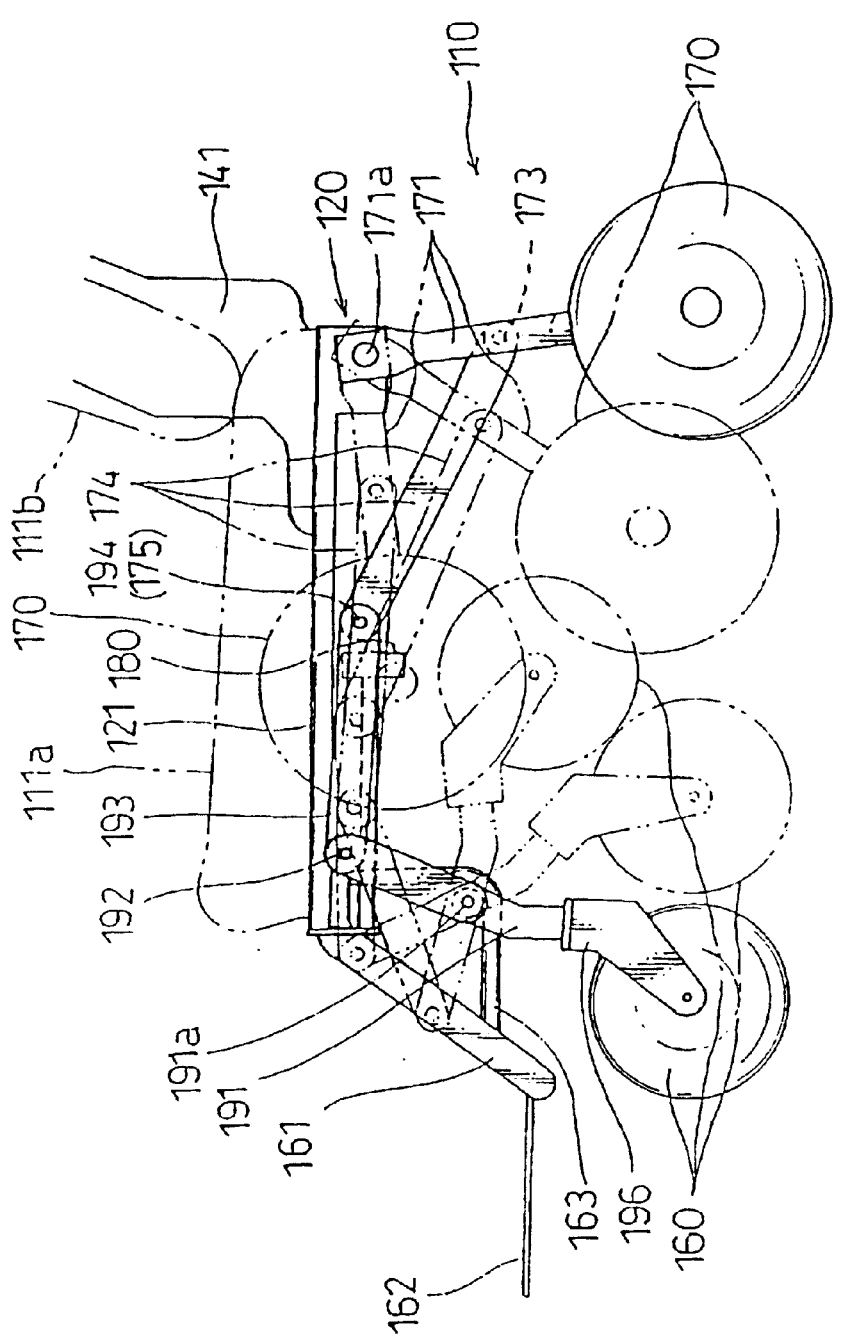
FIG. 18 is a side view of the seat unit in the second representative embodiment, illustrating how the front and rear wheels are retracted.

When the drive unit 186 moves the sliding frame 180, the front wheels 160 and the rear wheels 170 are coupled together by a coupling mechanism 135 and either retract upward or extend downward. In FIG. 18, a solid line shows the front and rear wheels 160 and 170 in the extended position. A broken line shows the retracting movement of the wheels 160 and 170 to the retracted position.

When the front wheels 160 are retracted, the front wheels 160 rotate from a vertical position to a horizontal position, which operation will now be described in further detail. As described above, the front wheel brackets 196 that rotatably support the front wheels 160 are rotatably supported about the axis of the front wheel stays 191. Thus, the front wheels 160 are supported to permit lateral swinging about the axis of the front wheel stays 191 or a caster axis C.

Figure 19:
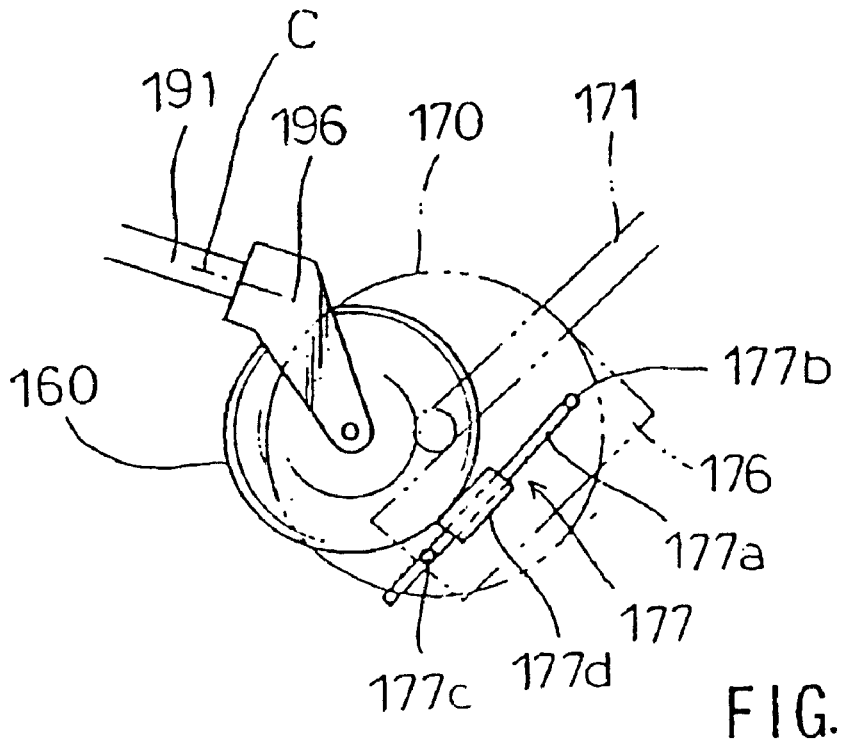
FIG. 19 is a side view of the front wheel, illustrating how the attitude of the front wheel is changed.
Figure 20:
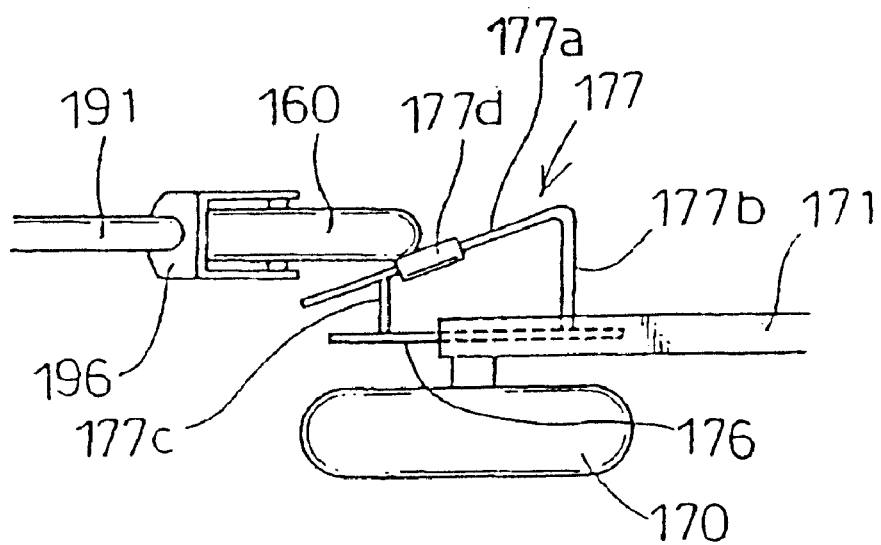
FIG. 20 is a plan view of the front wheel, illustrating how the attitude of the front wheel is changed.

On the other hand, as shown in FIG. 17, attitude control guides 177 are mounted on the rear wheel stays 171 via support plates 176. As shown in FIGS. 19 and 20, the attitude control guides 177 each have a bar-like guide body 177a and two support posts 177b. The guide body 177a is secured to the support plate 176 by the support post 177b and 177c. As shown in FIG. 20, the lower support post 177c is shorter than the upper support post 177b. Thus, the guide body 177a is inclined inwardly in the widthwise direction of the seat frame 120 from the lower end to the upper end.

Further, a collar 177d is mounted on each guide body 177a to permit rotation and movement within a predetermined range along an axial direction of the guide body 177a. Therefore, when the rear wheel stay 171 is in the extended position, the collar 177d moves to the lower end of the guide body 177a under its own weight.

When the front and rear wheels 160 are retracted, the edges of the front wheels 160 contact the collars 177 of the attitude control guides 177 at a position that is offset from the caster axis C. In this state, the rear wheel stays 171 rotate upward at a speed faster than the front wheel stays 191, so that the front wheels 160 gradually rotate from the vertical position to the horizontal position.

Further, the collar 177d is mounted on the guide body 177a to permit rotation and movement within a predetermined range along an axial direction of the guide body 177a. Consequently, the movements of the contact position (movement along the outer periphery of the front wheels 160) between the edges of the front wheels 160 and the collars 177d is smooth. Therefore, the retracting and attitude changing movements of the front wheels 160 and the retracting movement of the rear wheels 170 can be performed smoothly.

Like the first representative embodiment, the 'vertical position' refers to a position in which the axis of rotation of the front wheels 160 extends horizontally and the 'horizontal position' refers to a position in which the axis of rotation of the front wheels 160 extends vertically.

Further, because the front wheels 160 are thus automatically rotated to the horizontal position when in the storage position, the amount that the front wheels 160 project downward can be reduced. Therefore, the vertical position of the seat unit 110, when it is installed inside the vehicle, can be lowered.

Figure 15:
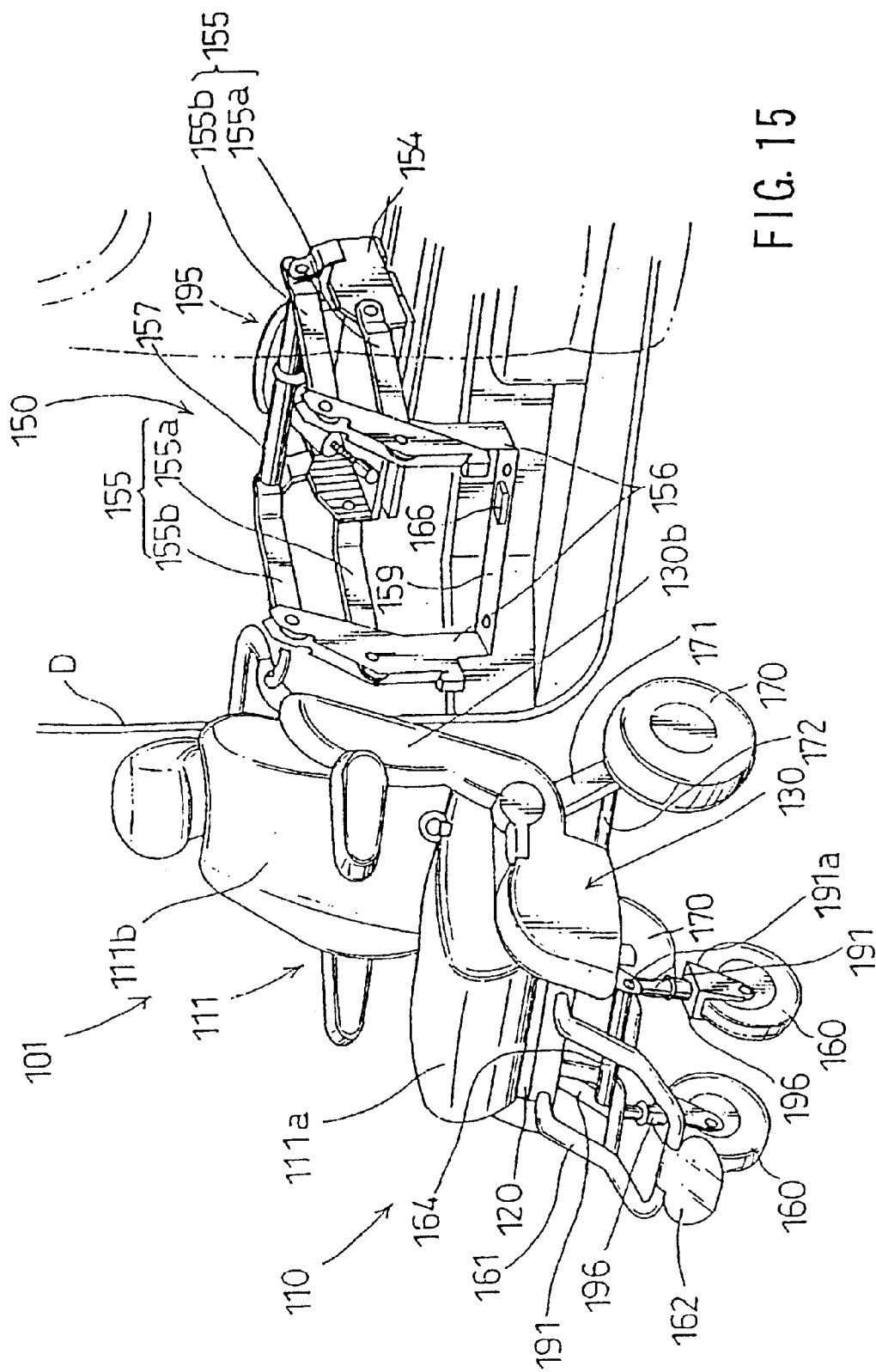
FIG. 15 is a perspective view of a vehicle seat according to a second representative embodiment, in which a seat unit is shown detached from a lift-up mechanism.
Figure 16:
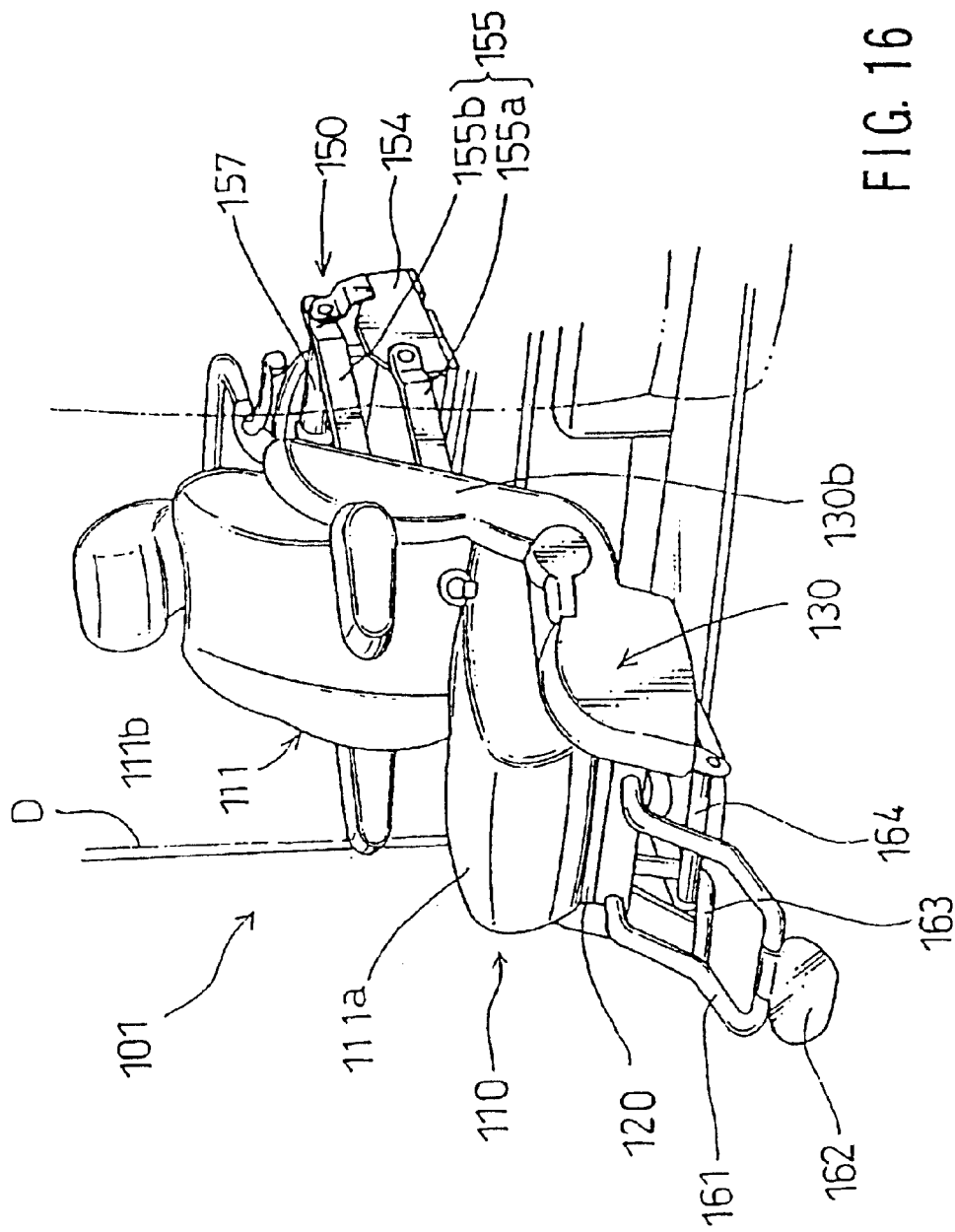
FIG. 16 is a perspective view of the vehicle seat according to the second representative embodiment, in which the seat unit is shown connected to the lift-up mechanism.
Figure 23:
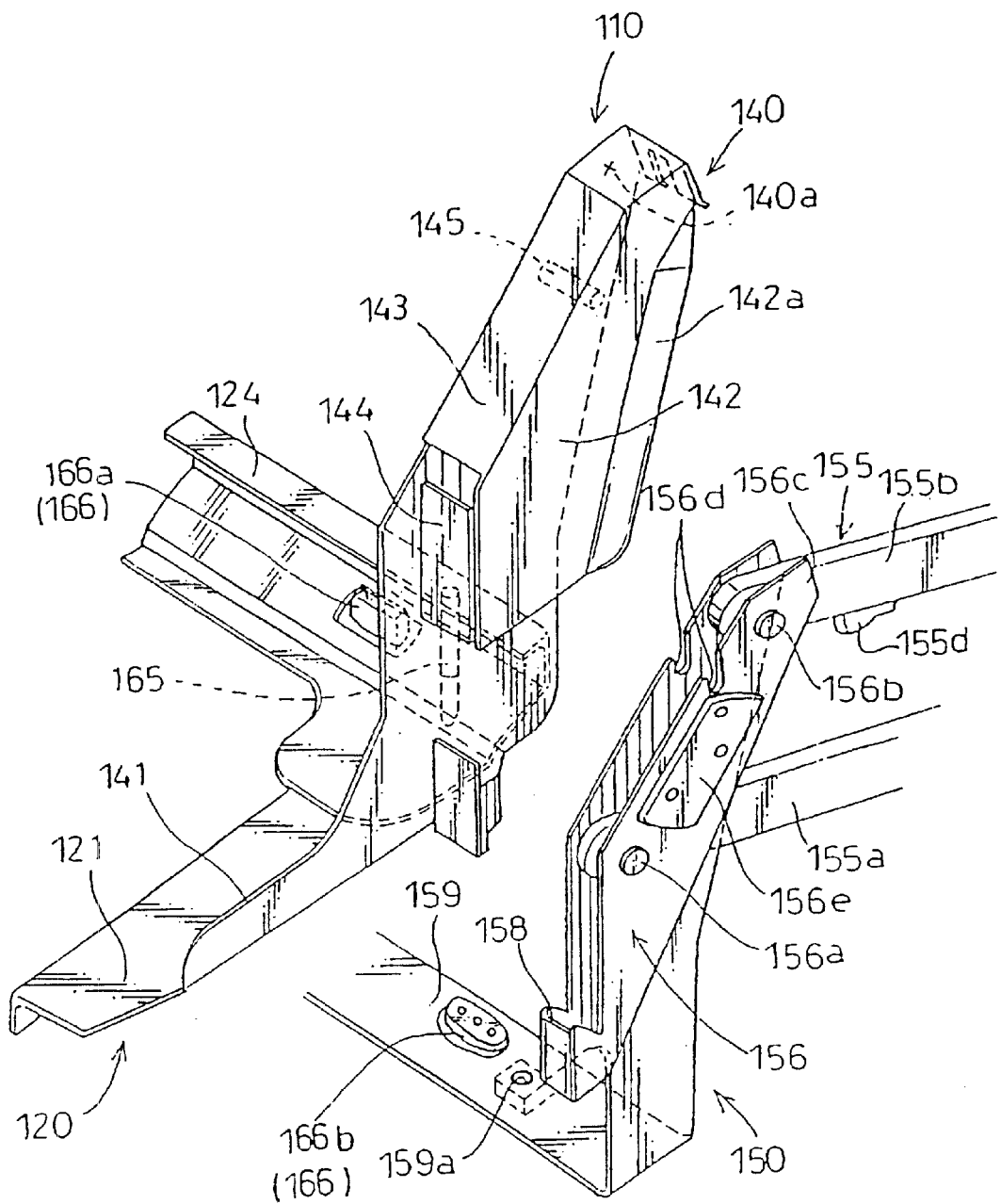
FIG. 23 is a perspective view of a connecting portion of the seat unit and surrounding parts in the second representative embodiment.
Figure 24:
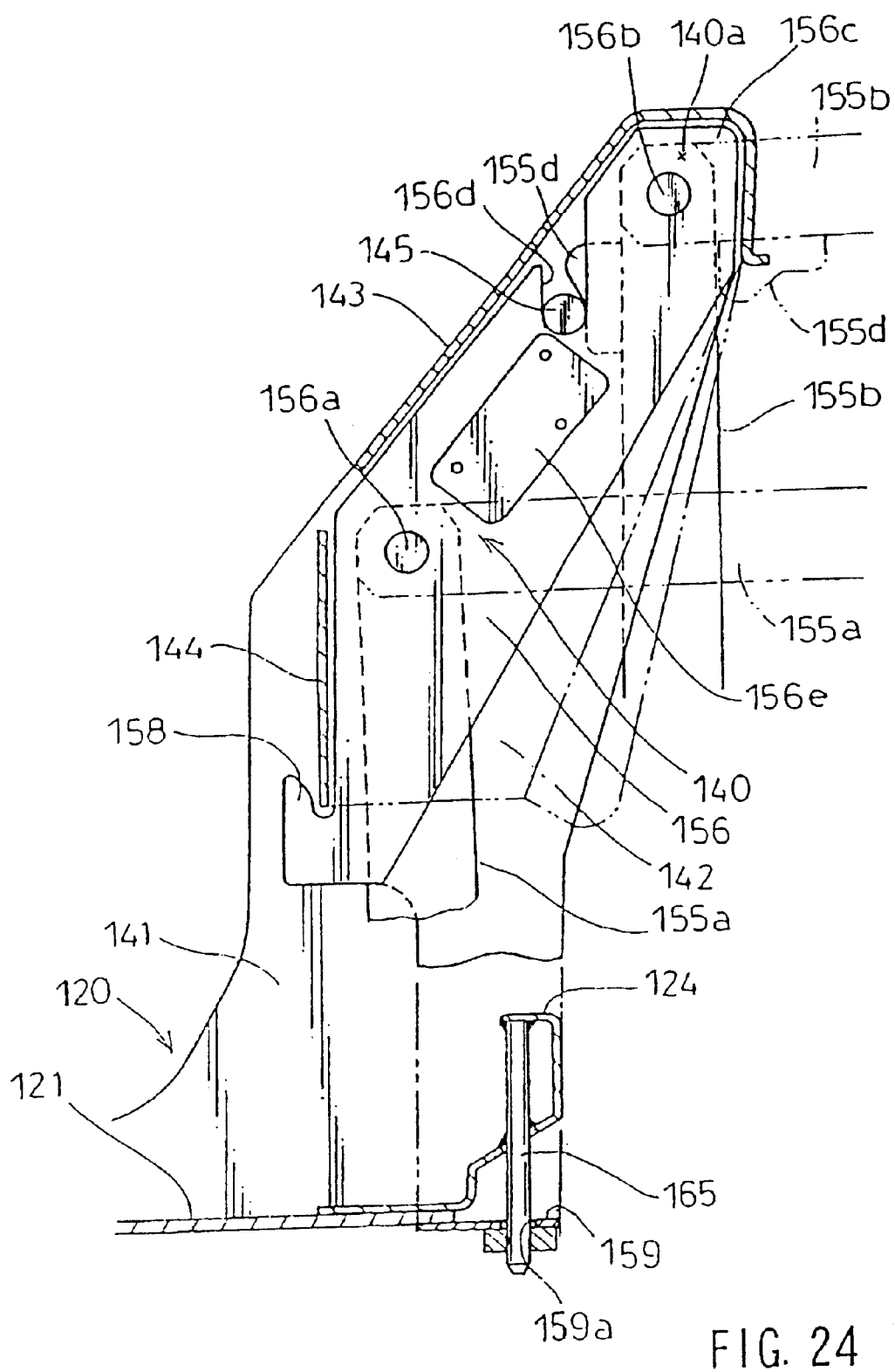
FIG. 24 is a side view showing the seat unit and the lift-up mechanism connected in the second representative embodiment.

As shown in FIG. 15, each of the right and left coverings 130 has an upright portion 130b along the sides of the seat back 11b. A connecting portion 140 is provided to connect the seat unit 110 to the lift-up mechanism 110 within each upright portion 30b and is shown in detail in FIGS. 23 and 24. The connecting portions 140 of the second representative embodiment are different from the connecting portions 40 of the first representative embodiment. The connecting portions 140 are constructed in symmetry, and therefore one connecting portion 140 on the left side as seen from the passenger will be described as well as shown in FIGS. 23 and 24.

A generally L-shaped first side plate 141 is attached to the rear portion of the left side frame 121 of the seat frame 120. A second side plate 142 is attached parallel to the upper portion of the first side plate 141 and is separated from the first side plate 141 by a predetermined distance. An upper front plate 143 and a lower front plate 144 are disposed between the front end edges of the side plates 141 and 142 to close the front end between the side plates 141 and 142. A catching recess 140a is defined in the upper portion of the connecting portion 140 and serves to receive and hold an upper portion 156c of a connecting plate 156.

Thus, the side plates 141 and 142 and the front plates 143 and 144 forms the generally box-shaped connecting portion 140 having open rear and bottom sides. The connecting plate 156 of the lift-up mechanism 150 is inserted into the connecting portion 140 from the open rear and bottom sides thereof. The rear end edge portion of the second side plate 142 is bent outwardly with a substantially uniform width, thereby forming a guide edge 142a. The guide edge 142a functions as a guide plate when the connecting plate 156 of the lift-up mechanism 150 is inserted into the connecting portion 140.

The seat unit 110 is connected to the lift-up mechanism 150 by inserting the connecting plates 156 of the lift-up mechanism 150 into the right and left connecting portions 140. A lock pin 145 is provided between the side plates 141 and 142 on the upper portions of the side plates 141 and 142. When the lock pin 145 is engaged with a pair of lock recesses 156d of the connecting plate 156, the connecting plate 156 and the connecting portion 140 are locked together, which locked connection will be described below in further detail.

The lift-up mechanism 150 that is installed inside the vehicle will now be described. The lift-up mechanism 150 of the second representative embodiment is different from the lift-up mechanism 50 of the first representative embodiment with respect to the connecting structure for the seat unit 110 (mainly in the design of the connecting plate 156). Although the other components may have the same design as the lift-up mechanism 50 of the first representative embodiment, a brief description will be given below.

Figure 26:
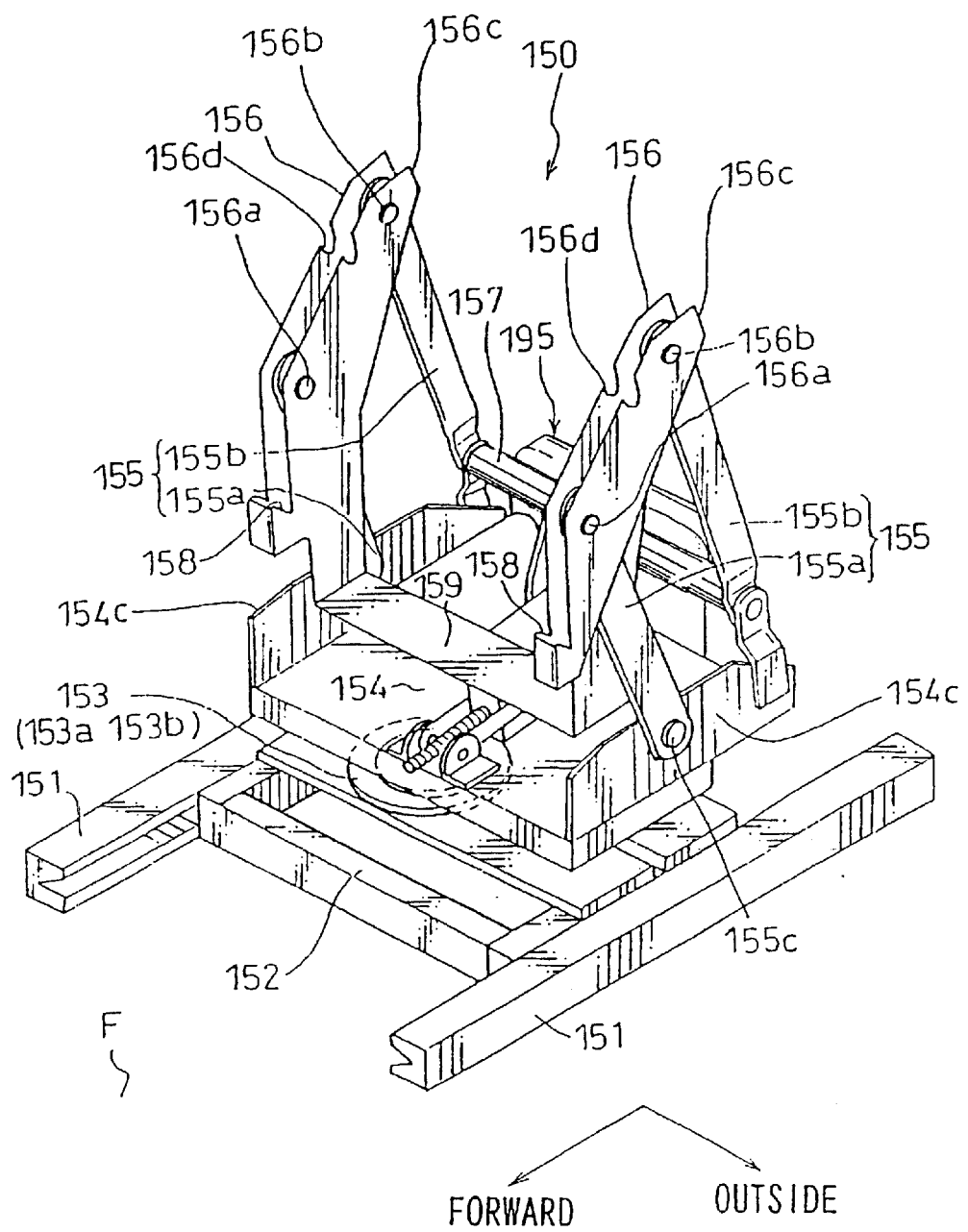
FIG. 26 is a perspective view of a lift-up mechanism in the second representative embodiment.

As shown in FIG. 26, the representative lift-up mechanism 150 of the second representative embodiment includes a main base 152, a rotary disc 153, a swing base 154, and a pair of four-joint link mechanisms 155. The main base 152 is longitudinally movably supported by a pair of slide rails 151 that is installed on the vehicle compartment floor F. The rotary disc 153 is mounted on the main base 152, and the swing base 154 is mounted on the rotary disc 153. The rotary disc 153 is constructed of an inner ring 153a and an outer ring 153b being assembled together to permit rotation with respect to each other. The outer ring 153b is fixed on the main base 152 and the inner ring 153a is fixed on the underside of the swing base 154. The swing base 154 can be rotated by the rotary disc 153 between a first position facing the front of the vehicle and a second position facing the side of the vehicle (the door opening side).

Further, like the first representative embodiment, a coupling mechanism is provided between the swing base 154 and the vehicle floor F to couple the rotational movement and the longitudinal movement of the swing base 154.

The four-joint link mechanisms 155 are provided on the both sides of the swing base 154. Each of the link mechanisms 155 has two link arms 155a and 155b. The lower end of each of the front link arms 155a is connected by a shaft 155c to a side wall 154c of the swing base 154 to permit vertical rotation. The lower ends of the rear link arms 155b are connected by a connecting shaft 157 that is mounted to permit rotation with respect to the side walls 154c of the swing base 154. Thus, when the connecting shaft 157 is rotated, the link arms 155b rotate vertically with respect to the swing base 154.

A motorized drive device 195 is connected to the connecting shaft 157 and serves as a drive source for driving the link mechanisms 155. When the motorized drive device 195 is actuated, the connecting shaft 157 rotates so that the link mechanisms 155 pivot downward or upward toward an upright position. Each of the connecting plates 156 is connected to the distal end of each link mechanism 155. The link arms 155a and 155b are rotatably connected to the connecting plate 156 via shafts 156a and 156b, respectively.

As shown in FIG. 24, the connecting plates 156 have a generally flat plate-like shape that can be inserted into the connecting portions 140 of the seat unit 110 with a small clearance. When the upper portions 156c of the connecting plates 156 are inserted into the associated catching recesses 140a, the upper portions 156c are connected to the seat unit 110.

A lock claw 158 is provided on the lower portion of each of the connecting plates 156. When the lock claw 158 is engaged with the lower front plate 144 of the connecting portion 140 from below, the lower portion of the connecting plate 156 is connected to the seat frame 120 and thus to the seat unit 110. Further, a lock recess 156d is formed in the front side of each of the connecting plates 156. As shown in FIGS. 23 and 24, a block 155d is mounted on each of the rear link arms 155a and 155b of the link mechanisms 155 near the shafts 156b. When the connecting plates 156 are connected to the connecting portions 140 as shown in FIG. 24, a lock pin 145 of each of the connecting portions 140 is fitted into the lock recesses 156d, so that the connecting plates 156 are connected to the seat frame 120 and thus to the seat unit 110.

Further, when the seat unit 110 is moved toward the inside of the vehicle by the lift-up mechanism 150, the front and rear link arms 155a and 155b turn into a substantially upright position. As a result, the blocks 155d extend over the lock pins 145, so that the lock pins 145 are prevented from disengaging from the lock recesses 156d. Therefore, the seat unit 110 can be reliably connected to the lift-up mechanism 150 inside the vehicle.

Figure 25:
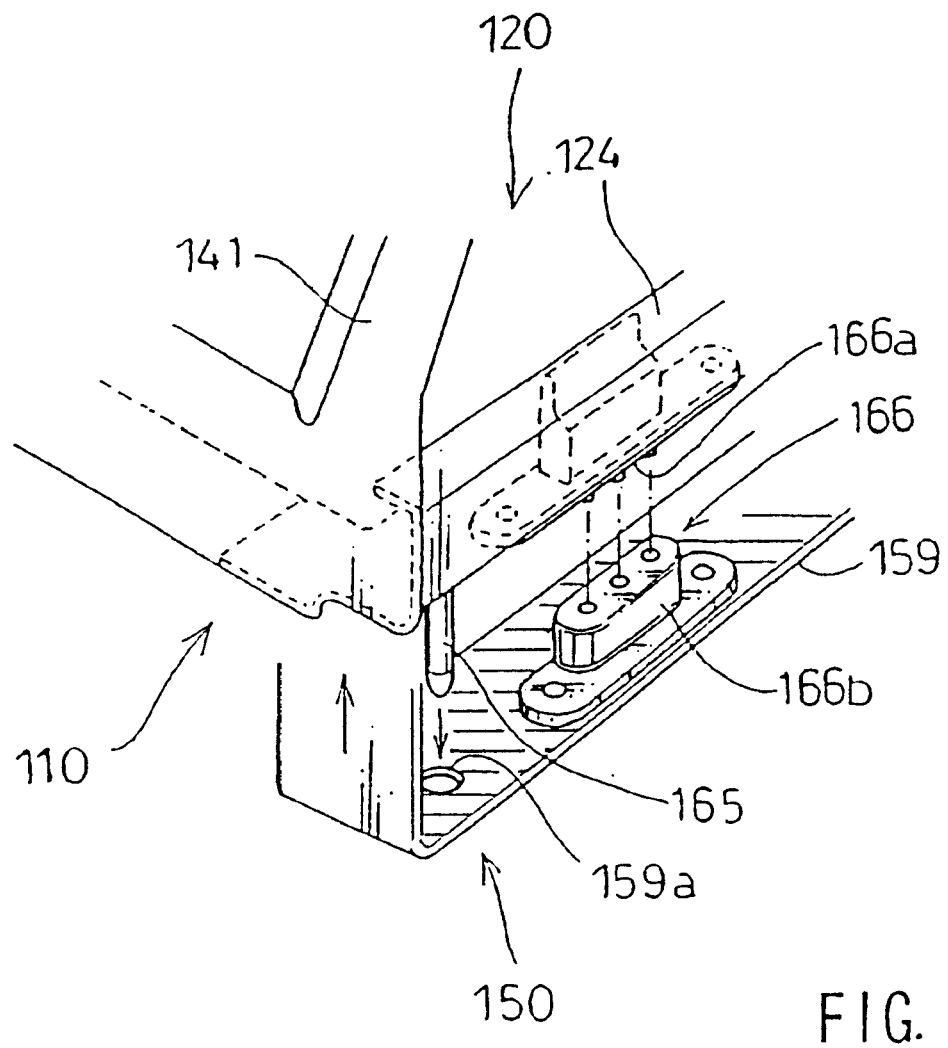
FIG. 25 is a perspective view illustrating how a receiving frame of the lift-up mechanism is superposed with a rear frame of a seat frame from below.

Sliding plates 156e having a predetermined thickness are mounted on the both sides of the connecting plates 156. Using these sliding plates 156e, the connecting plates 156 can be smoothly inserted into the connecting portions 140 without rattling. A receiving frame 159 connects the lower ends of the connecting plates 156. When the seat unit 110 is connected to the lift-up mechanism 150, the receiving frame 159 is superposed with the rear frame 124 of the seat frame 120 of the seat unit 110 from below As shown in FIG. 25, a positioning pin 165 is mounted to and projects downward from the rear frame 124 near each of the right and left side frames 121. Two positioning holes 159a are formed in the receiving frame 159. The positioning pins 165 enable the seat unit 110 to be positioned with respect to the lift-up mechanism 150. That is, when the positioning pins 165 are inserted into the positioning holes 159a, the lift-up mechanism 150 is positioned with respect to the seat unit 110.

Further, a male portion 166a of a power connector (junction connector) 166 is mounted on the rear frame 124 of the seat frame 120 and a female portion 166b of the power connector 166 is mounted on the receiving frame 159. When the seat unit 110 is connected to the lift-up mechanism 150, the rear frame 124 of the seat frame 120 is superposed on the receiving frame 159. At the same time, the male portion 166a of the power connector 166 is connected to the female portion 166b, so that the seat unit 110 is electrically connected to the lift-up mechanism 150. The male portion 166a of the power connector 166 is connected to the electric motor 185 of the drive unit 186. Thus, when the male portion 166a of the power connector 166 is connected to the female portion 166b, power is supplied to the electric motor 185 of the drive unit 186. Therefore, the retracting and extending operations of the front wheels 160 and rear wheels 170 can be driven by the electric motor 185.

The operations of moving the seat unit 110 from the inside to the outside of the vehicle by using the lift-up mechanism 150 will now be described in further detail. The following operations can be performed with the passenger sitting in the seat unit 110.

FIG. 15 shows the seat unit 110 being separated from the lift-up mechanism 150. The four-joint link mechanisms 155 of the lift-up mechanism 150 are shown rotated downward. The front and rear wheels 160 and 170 of the seat unit 110 are shown extended downward in a state in which the seat unit 110 is ready for use as a normal wheelchair.

The seat unit 110 is connected to the lift-up mechanism 150 from the above state and moved into the vehicle compartment by the following procedure. First, the seat unit 110 is placed sufficiently close to the lift-up mechanism 150 with its back toward the lift-up mechanism 150 and the receiving frame 159 is positioned below the rear frame 124 of the seat frame 120. The connecting shaft 157 is then rotated (in a reverse direction), so that the link mechanisms 155 slightly pivot toward the upright position. The connecting plates 156 and the receiving frame 159 are then raised together such that the receiving frame 159 is superposed with the rear frame 124 of the seat frame 120 from below.

During this operation, the positioning pins 165 are inserted into the positioning holes 159a, so that the lift-up mechanism 150 is positioned with respect to the seat unit 110. Further, the male portion 166a of the power connector 166 is connected to the female portion 166b, so that power is supplied to the drive unit 186.

When the connecting plates 156 are raised, the connecting plates 156 are inserted into the connecting portions 140. At this time, the upper portions 156c of the connecting plates 156 are inserted into the catching recesses 140a of the connecting portions 140. Thus, each of the lock claws 158 of the connecting plates 156 are engaged with the lower end edge of the lower front plate 144 of the associated connecting portion 140 from below. Further, each of the lock pins 145 is fitted into the lock recess 156d of the associated connecting plate 156. As a result, the connecting plates 156 are connected to the connecting portions 140 and locked to prevent lateral and rearward movements.

The connecting plates 156 are thus connected to the connecting portions 140 by moving the link mechanisms 155 of the lift-up mechanism 150 toward the upright position (toward the inside of the vehicle). In this state, when the link mechanisms 155 are further moved toward the upright position, the seat unit 110 is lifted up above the ground and at this time, the lift-up mechanism 150 is stopped.

When the seat unit 110 has been lifted up above the ground, the front and rear wheels 160 and 170 are retracted. FIG. 18 shows how the front and rear wheels 160 and 170 are retracted. To retract the front and rear wheels 160 and 170, the electric motor 185 of the drive unit 186 is rotated in a forward direction using power supplied to the electric motor 185 of the drive unit 186 via the power connector 166. When the electric motor 185 is rotating in the forward direction, the sliding frame 180 moves with respect to the seat frame 120 in the retracting direction (to the left in FIG. 18). Thus, the front wheel link arms 193 and the rear wheel link arm 174 move in the retracting direction (to the left in FIG. 18). Therefore, the front wheel stays 191 rotate around the shafts 191a in the retracting direction (counterclockwise in FIG. 18), so that the front wheels 160 are moved into the retracted position. At the same time, the rear wheel stays 171 rotate around the shafts 171a in the retracting direction (clockwise in FIG. 18), so that the rear wheels 170 are moved forward into the retracted position.

Figure 21:
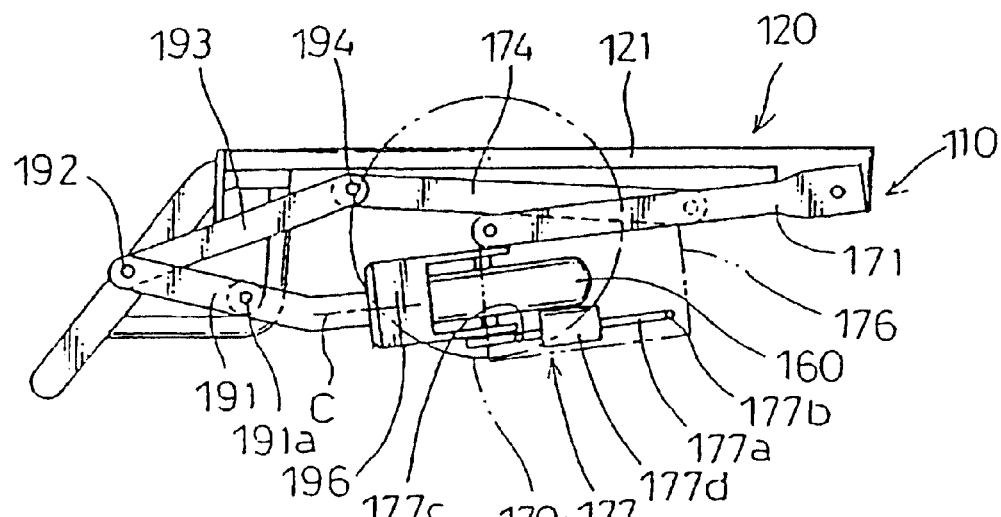
FIG. 21 is a side view of the front wheel in a horizontal position.
Figure 22:
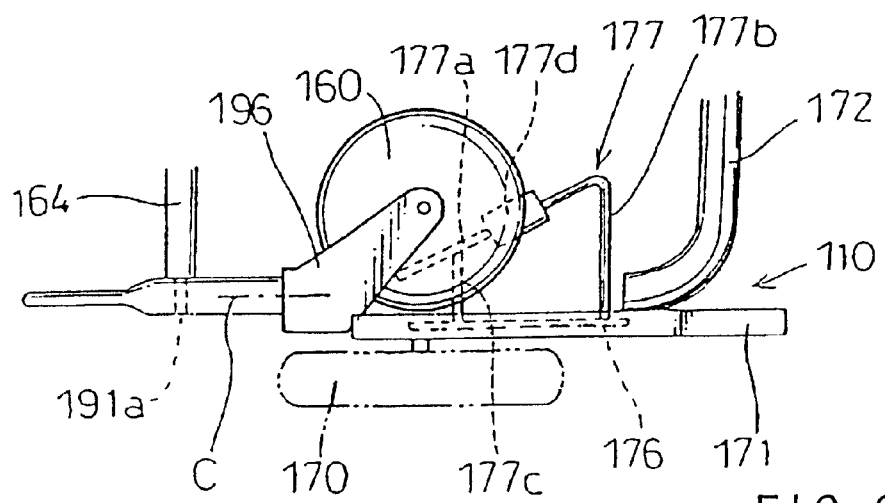
FIG. 22 is a plan view of the front wheel in a horizontal position.

In the final stage of the retracting operation of the front and rear wheels 160 and 170, as described above, the front wheels 160 are rotated from the vertical position to the horizontal position. FIGS. 19 to 22 show how the front wheels 160 are rotated to the horizontal position. As shown in FIGS. 19 and 20, during the retracting operation, the front wheels 160 and the rear wheels 170 move toward each other and the edge portions of the front wheels 160 contact the collars 177d of the attitude changing guides 177. In this state, when the rear wheel stays 171 further rotate in the retracting direction, the brackets 196 of the front wheels 160 rotate with respect to the front wheel stays 191. As a result, the front wheels 160 move onto the guide bodies 177a and thus the front wheels 160 are turned into the horizontal position as shown in FIGS. 21 and 22.

When the front wheels 160 are completely rotated to the horizontal position, the front and rear wheel retracting operation is complete. A sensor (limit switch) optionally can be used to detect when the sliding frame 180 has reached its front or rear moving end position. When the sliding frame 180 reaches its front moving end position (i.e. completion of the retracting operation), the sensor can generate a stop signal that deactivates the electric motor 185. In addition or in the alternative, when the sliding frame 180 reaches its rear moving end position (i.e. completion of the extending operation), the sensor can generate a stop signal that deactivates the electric motor 185.

After the operation of holding the front and rear wheels 160 and 170 has thus been completed, the link mechanisms 155 are rotated again into the upright position to move the seat unit 110 into the vehicle compartment. When the link mechanisms 155 stand upright and thus the seat unit 110 is positioned substantially above the swing base 154, the movement of the motorized drive device 195 is stopped, thereby stopping the movement of the lift-up mechanism 150. The link mechanisms 155 are locked in the upright position by the swing lock mechanism (not shown). Thus, the seat unit 110 is held in position above the swing base 154.

Further, when the seat unit 110 is positioned substantially above the swing base 154 and the rear link arms 155b of the link mechanisms 155 stand substantially upright, as shown in FIG. 24, the blocks 155d extend over the lock pins 145. Therefore, the lock pins 145 are prevented from disengaging from the lock recesses 156d, so that the seat unit 110 is locked in a connected state with respect to the lift-up mechanism 150.

After the seat unit 110 has thus been moved inside the vehicle, the seat unit 110 and the swing base 154 are manually rotated together by about 90°, so that the seat unit 110 is rotated to the first position facing the front of the vehicle. At this time, by using the coupling mechanism described above, the seat unit 110 can be moved rearward while rotating to the first position. Thus, the seat unit 110 is positioned in a predetermined position in the longitudinal direction of the vehicle, while being rotated to the first position.

By reversing the above-described procedure, the seat unit 110 can be moved from the inside to the outside of the vehicle and the seat unit 110 will be available for use as a wheelchair by itself. This operation can be performed by first manually moving the seat unit 110 forward by a predetermined distance while rotating it to the second position facing the door opening D. When the seat unit 110 has reached the second position, the connecting shaft 157 can be rotated in the reverse direction by the motorized drive device 195 of the lift-up mechanism 150, so that the link mechanisms 155 pivot downward. Thus, the seat unit 110 is moved from the inside to the outside of the vehicle.

When the link mechanisms 155 and thus the link arms 155a and 155b pivot downward, as shown by broken line in FIG. 24, the link arms 155a and 155b rotate counterclockwise with respect the connecting plates 156 and around the shafts 156a and 156b. When the link arms 156a and 155b rotate counterclockwise with respect the connecting plates 156, the blocks 155d are moved away from above the lock pins 145. Thus, the lock pins 145 are allowed to disengage from the lock holes 156d.

After the seat unit 110 has been moved out of the vehicle, but before being placed on the ground, the retracted front and rear wheels 160 and 170 are extended by driving the electric motor 185 of the drive unit 186 in the reverse direction. When the electric motor 185 is rotated in the reverse direction, the sliding frame 180 moves in the extending direction (to the right in FIG. 18). Thus, the front wheel link arms 193 and the rear wheel link arm 174 moves in the extending direction. Therefore, the front wheel stays 191 rotate around the shafts 191a in the extending direction (clockwise in FIG. 18), so that the front wheels 160 are extended downward. At the same time, the rear wheel stays 171 rotate around the shafts 171a in the extending direction (counterclockwise in FIG. 18), so that the rear wheels 170 are extended downward.

After the front and rear wheels 160 and 170 have thus been extended, the four-joint link mechanisms 155 are further rotated downward to place the seat unit 110 on the ground. After the seat unit 110 has been placed on the ground, the link mechanisms 155 are further rotated downward and the connecting plates 156 are removed from the connecting portions 140. At this time, the blocks 155d are located away from above the lock pins 145, and thus the lock pins 145 can disengage from the lock holes 156d. Therefore, the connecting plates 156 can move downward with respect to the connecting portions 140 of the seat unit 110. After the seat unit 110 has been placed on the ground, the link mechanisms 155 are further rotated downward to displace the connecting portions 140 downward. Thus, the lock claws 158 disengage from the upper end edges of the lower front plates 144, and the lock pins disengage from the lock holes 156d. Further, the upper end portions 156c of the connecting plates 156 are removed from the catching recesses 140a.

When the connecting plates 156 are displaced downward with respect to the connecting portions 140, the receiving frame 159 is separated from the rear frame 124 of the seat frame 120. Thus, the positioning pins 165 are disengaged from the positioning holes 159a. Further, the male portion 166a of the power connector 166 is disconnected from the female portion 166b, so that the power supply to the drive unit 186 is shut off.

When the seat unit 110 is moved forward after the connecting plates 156 have been displaced downward with respect to the connecting portions 140, the seat unit 110 is completely detached from the lift-up mechanism 150. Thereafter, the seat unit 110 can be used as a wheelchair by itself. After the lift-up mechanism 150 has been detached from the seat unit 110, it can be returned into an original position inside the vehicle by rotating the link mechanisms 155 to the upright position.

With the seat unit 110 according to the second representative embodiment, the operations of retracting and extending the front and rear wheels 160 and 170 can be performed by the drive unit 186 having the electric motor 185. Therefore, it is not necessary to manually retract or extend the front and rear wheels 160 and 170, thereby making the seat unit more convenient to use. The front and rear wheels 160 and 170 can be retracted while the passenger is sitting in the seat unit 110, thereby further simplifying the steps of getting into and out of the vehicle.

Moreover, the front wheels 160 are forced to turn from the vertical position to the horizontal position as the front and rear wheels 160 and 170 are retracted, and the front wheels 160 are stored in the horizontal position beneath the seat cushion 111a. Thus, the distance that the front wheels 160 protruded downward beneath the seat cushion 111a can be minimized and the vertical position of the seat unit 110 when installed inside the vehicle can be lowered. Consequently, the passenger can be seated in substantially the same vertical position as other passengers in the vehicle.

Further, the collar 177d is mounted to permit rotation and axial movement on a portion of the guide body 177a of the attitude changing guide 177, which contacts the front wheels 160. Thus, the attitude of the front wheels 160 can be smoothly changed without interfering with the retracting movement of the front and rear wheels 160 and 170.

When the seat unit 110 is connected to the lift-up mechanism 150, the male portion 166a of the power connector 166 is automatically connected to the female portion 166b of the power connector 166, whereby power is supplied to the drive unit 186. Thus, the need for a power cord can be eliminated, thereby decreasing the time and labor required to retract or extend the front and rear wheels 160 and 170. Further, when the seat unit 110 is detached from the lift-up mechanism 150, the male portion 166a of the power connector 166 is automatically disconnected from the female portion 166b of the power connector 166. Therefore, the possibility that the power cord could be cut or damaged by the movement of the seat unit with a power cord inadvertently left connected is reduced.

When the seat unit 110 is connected to the lift-up mechanism 150, the positioning pins 165 of the seat unit 110 are inserted into the positioning holes 159 of the lift-up mechanism 150 to be positioned with each other. Thus, the male portion 166a of the power connector 166 is reliably connected to the female portion 166b. Moreover, when the connecting plates 156 of the lift-up mechanism 150 are inserted into the connecting portions 140 of the seat unit 110 from below, the lock claws 158 of the connecting plates 156 are engaged with the lower edges of the lower front plates 144 of the connecting portions 140 from below. At the same time, the lock pins 145 are fitted into the lock recesses 156d of the connecting plates 156. Thus, the seat unit 110 can be reliably connected to the lift-up mechanism 150.

Further, when the rear link arms 155b of the link mechanisms 155 of the lift-up mechanism 150 turn into a substantially upright position with the seat unit 110 connected to the lift-up mechanism 150, the blocks 155d mounted on the rear link arms 155b extend over the lock pins 145, thereby preventing the lock-pins 145 from disengaging from the lock recesses 156d. Therefore, the seat unit 110 is more securely locked in the connected state with respect to the lift-up mechanism 150 and rattling of the seat unit 110 can be prevented.

If the seat unit 110 is configured to be connected to the lift-up mechanism 150 by inserting the connecting plates 156 of the lift-up mechanism 150 into the connecting portions 140 of the seat unit 110, the connection of the connecting plates 156 to the connecting portions 140 is not visible from the outside. Therefore, the exterior appearance of the vehicle is not impaired. Further, weight and cost reductions of the seat unit 110 can be achieved.

When the seat unit 110 is connected to the lift-up mechanism 150, the positioning pins 165 mounted to the rear frame 124 of the seat unit 110 are inserted into the positioning holes 159a formed in the receiving frame 159 of the lift-up mechanism 150. Thus, misalignment of the seat unit 110 with respect to the lift-up mechanism 150 can be prevented. Further, the seat unit 110 can be reliably prevented from being detached from the lift-up mechanism 1 even when a great impact force is applied on the vehicle.

As noted above, various modifications, additions and deletions may be made to the above-described second representative embodiment. For example, although the threaded shaft 183 and the nut 182 were described above as being provided as a moving mechanism for moving the sliding frame 180, various other moving mechanisms may be used. For example, a rack and pinion device may be utilized. In this case, the rack is mounted on the sliding frame 180 and the pinion gear engaged with the rack is rotated by an electric motor, so that the sliding frame 180 is moved.

In addition, the front wheels 160 and the rear wheels 170 are not required to be coupled together to be retracted. For example, two electric motors, one for retracting the front wheels and the other for retracting the rear wheels, may be provided to retract the front wheels and the rear wheels separately.

Figure 27:
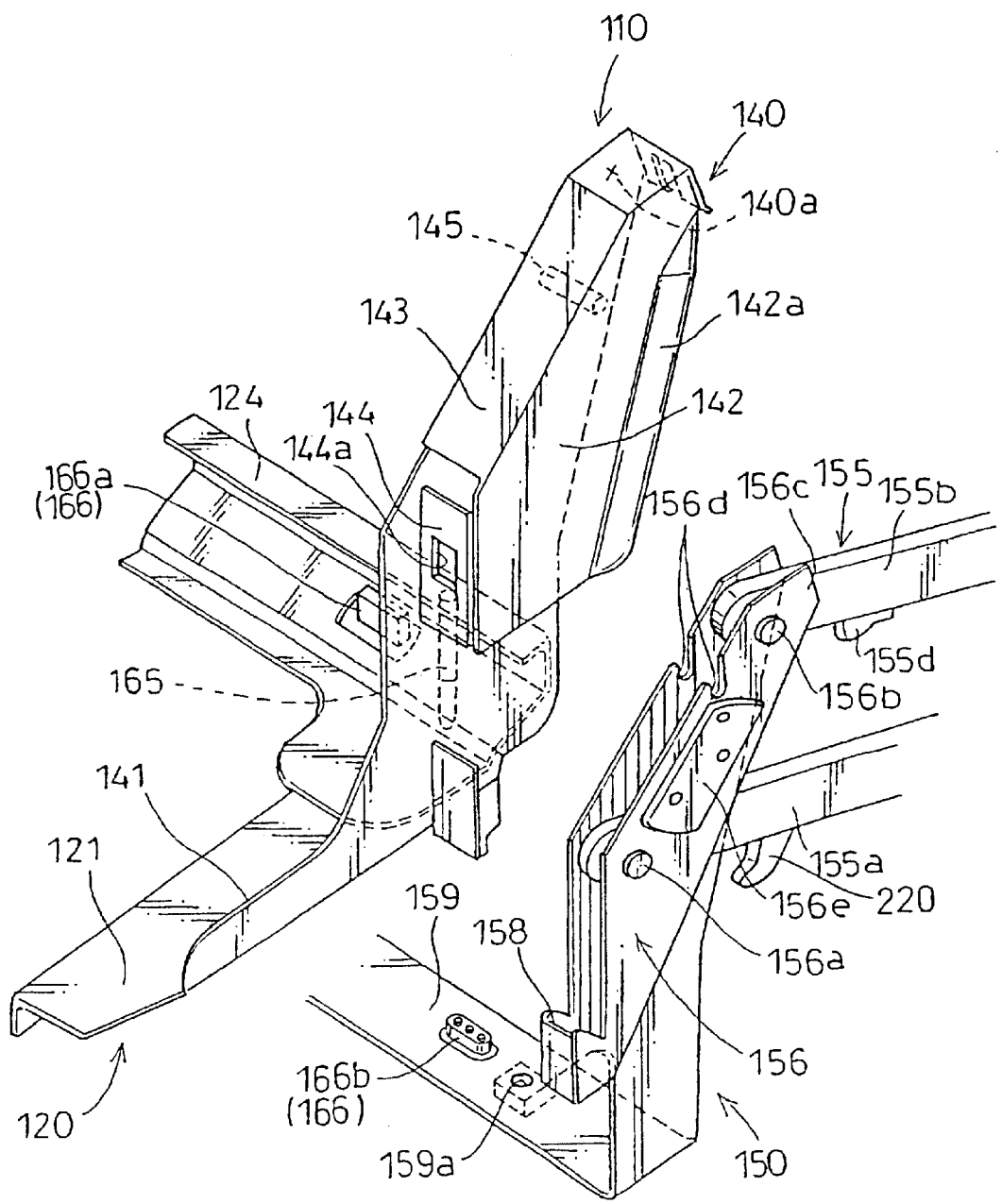
FIG. 27 is a perspective view of a connecting portion of a seat unit and surrounding parts in a third representative embodiment providing a connecting hook on a lift-up mechanism.
Figure 28:
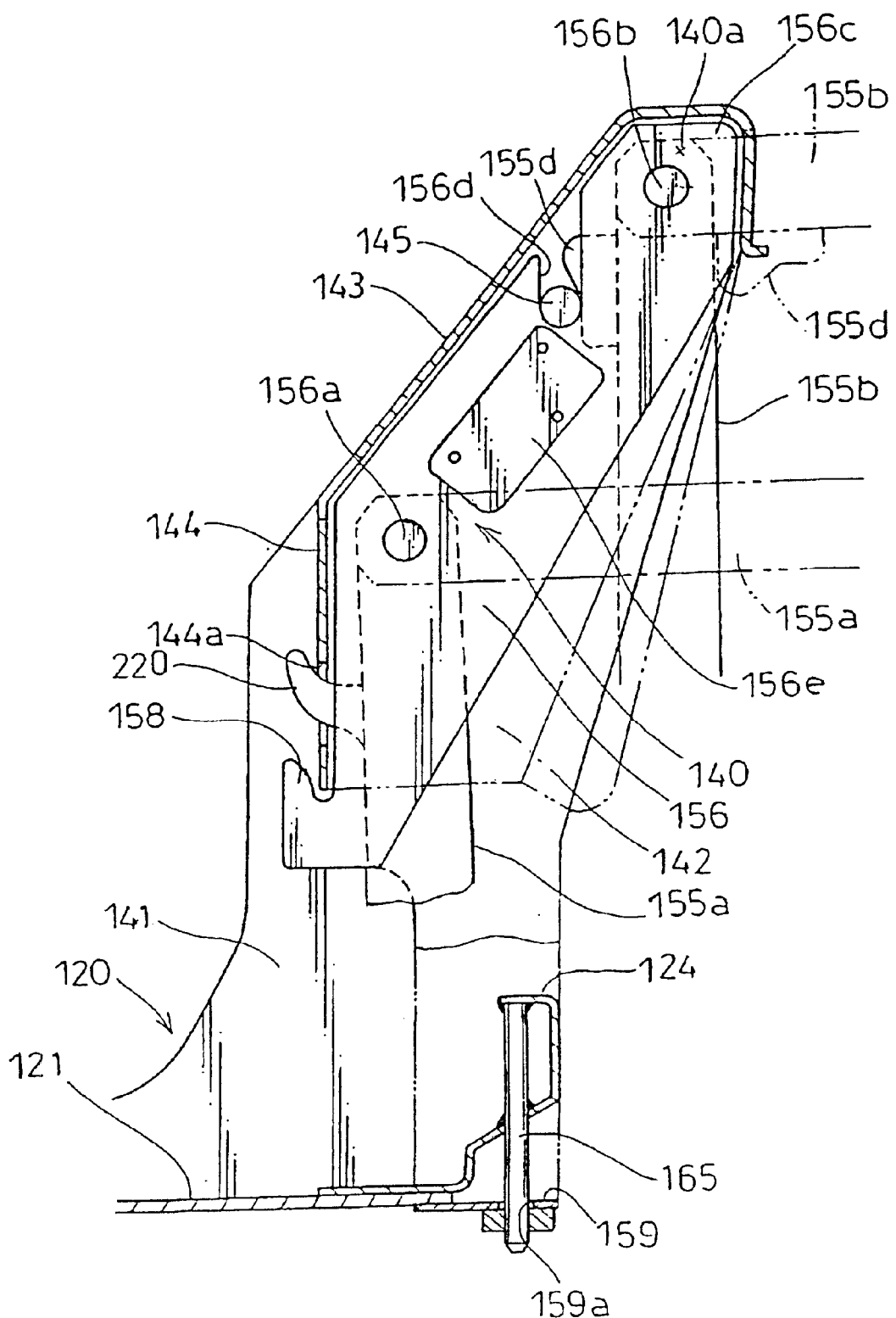
FIG. 28 is a side view showing the seat unit and the lift-up mechanism connected in the third representative embodiment.

Another modification is shown in FIGS. 27 and 28 in which a connecting hook 220 is also taught to provide a more secure connection between the connecting plate 156 and the lift-up mechanism 150 with respect to the connecting portion 140 of the seat unit 110. The upwardly curved connecting hooks 220 are mounted on the front ends of the link arms 155a of the link mechanisms 155. Connecting holes 144a are formed in the lower front plates 144 of the connecting portions 140 to correspond to the connecting hooks 220.

After the seat unit 110 has been connected to the lift-up mechanism 150 by inserting the connecting plates 156 of the lift-up mechanism 150 into the connecting portions 140 of the seat unit 110, the link arms 155a will rotate toward the upright position when the link mechanisms 155 are rotated toward the upright position. At this time, the connecting hooks 220 are rotated from above the connecting holes into the connecting holes 144a.

As shown in FIG. 28, when the link arms 155a of the link mechanisms 155 point substantially upright, the connecting hooks 220 are engaged in the connecting holes 144a. Thus, the connecting portions 140 of the seat unit 110 are directly connected to the link arms 155a. Both the connecting plates 156 and the link arms 155a are connected to the connecting portions 140 of the seat unit 110, so that the seat unit 110 is more securely locked to the lift-up mechanism 150. Thus, the seat unit 110 can be more reliably prevented from being displaced forward or detached from the lift-up mechanism 150 when a great force is applied to the seat unit 110 while the vehicle is moving.

Figure 29:
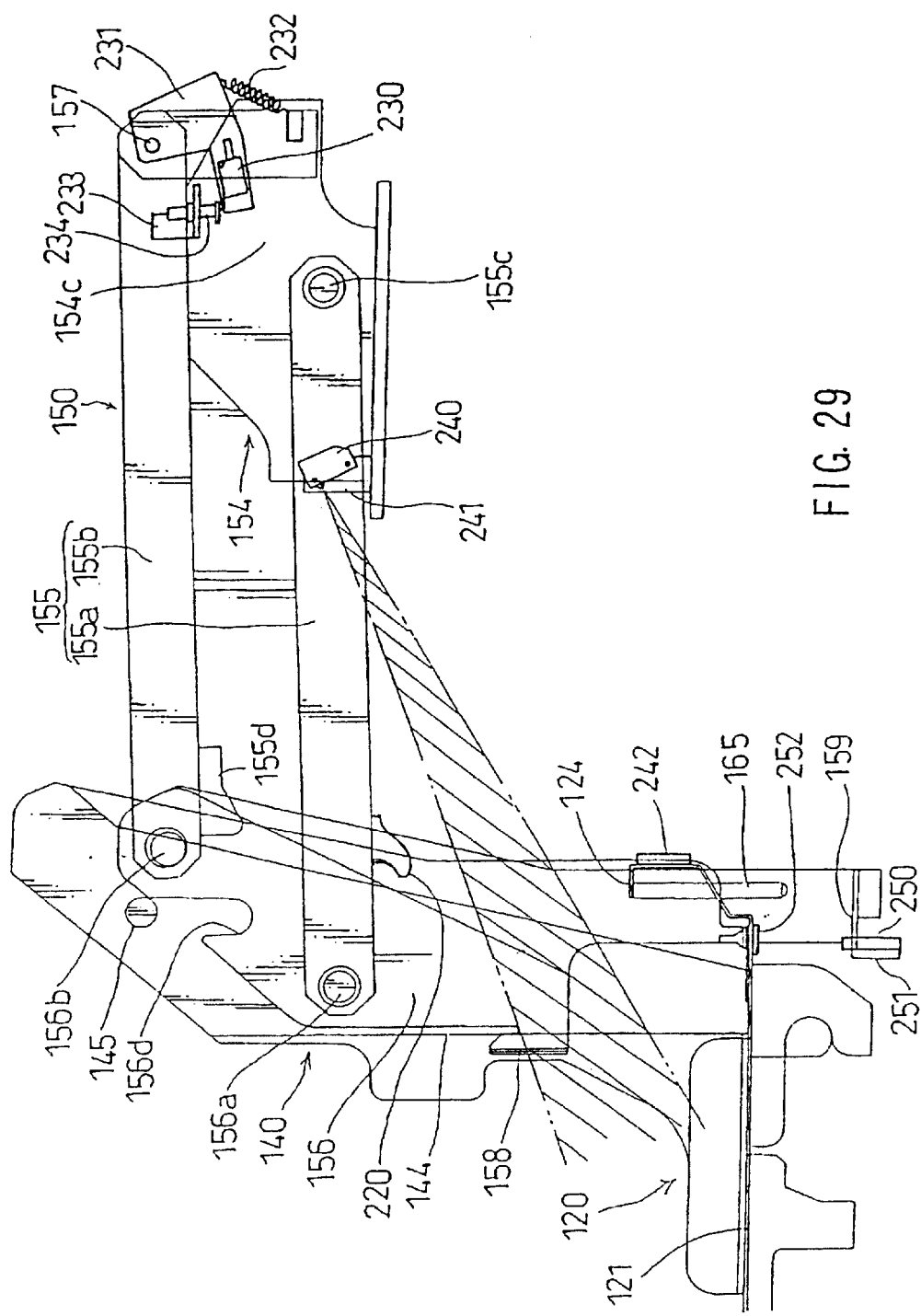
FIG. 29 is a side view showing a seat connection confirmation mechanism provided on the vehicle seat according to the third representative embodiment.

As shown in detail in FIG. 29, a seat connection confirmation mechanism also may be provided on the vehicle seat 101 to confirm that the seat unit 110 is securely connected to the lift-up mechanism 150. The optional seat connection confirmation mechanism may include a lift sensor 230, a seat confirmation sensor 240 and a connection confirmation sensor 250. The lift sensor 230 detects the position (level) of the connecting plates 156 of the lift-up mechanism 150. The seat confirmation sensor 240 detects the existence of the seat unit 110 and the connection confirmation sensor 250 detects whether the connecting plates 156 have been properly connected to the seat unit 110.

The lift sensor 230 is preferably a limit switch of a normally "on" type and is mounted on one side wall 154c of the swing base 154 via a bracket 231. The bracket 231 is mounted to permit vertical rotation around the connecting shaft 157 that rotatably supports the rear link arms 155b. A tension spring 232 is disposed between the bracket 231 and the side wall 154c, so that the bracket 231 is urged or biased in the clockwise direction in FIG. 29. Further, a detection bar 234 is mounted on the rear link arm 155b near the connecting shaft 157 via a bracket 233.

The axial position of the detection bar 234 is adjustable and can be adjusted such that the detection bar 234 depresses the lift sensor 230 within a range in which the rear link arms 155b rotate upward from the lowermost position (shown in FIG. 29) by a set angle θ. When the lift sensor 230 is depressed by the detection bar 234, the lift sensor 230 is deactivated. When the lower end of the detection bar 234 is disengaged from the operating part of the lift sensor 230, the lift sensor 230 is released and thereby is activated. The above set angle θ is set to an angle of upward movement of the link arms 155b that is required to lift the connected seat unit 110 slightly above the ground in order to retract the front and rear wheels 160 and 170.

The seat confirmation sensor 240 is preferably a reflection photo-electronic sensor and is mounted on the swing base 154 near the front end thereof via a bracket 241. A reflector 242 for reflecting light emitted from the seat confirmation sensor 240 is mounted on the rear surface of the rear frame 124 of the seat frame 120. Light emitted from the seat confirmation sensor 240 is reflected from the reflector 242 and the seat confirmation sensor 240 detects the reflected light. At this time, the seat confirmation sensor 240 is activated, which indicates the existence of the seat unit 110. When the seat unit 110 is not in a proper position with respect to the lift-up mechanism 150, light emitted from the seat confirmation sensor 240 is not reflected from the reflector 242, or if reflected, the reflected light is not detected by the seat confirmation sensor 240. Therefore, the seat confirmation sensor 240 is not activated, thereby indicating that the seat unit 110 is not in a proper position with respect to the lift-up mechanism 150. Also, when storing the lift-up mechanism 150 inside the vehicle when the seat unit 110 is used as a wheelchair, the seat confirmation sensor 240 is not activated, which indicates that the seat unit 110 is not attached to the lift-up mechanism 150.

The connection confirmation sensor 250 also is preferably a limit switch of a normally "on" type and is mounted via a bracket 251 on the receiving frame 159 that connects the lower ends of the connecting plates 156. On the underside of the receiving frame 159, a detection plate 252 can be mounted to correspond to the connection confirmation sensor 250. As described above, when the lift-up mechanism 110 is rotated to the upright position with the receiving frame 159 positioned below the rear frame 124 of the seat frame 120, the receiving frame 159 is superposed with the underside of the rear frame 124 from below, if the seat unit 110 is in a proper position with respect to the lift-up mechanism 150. In this case, the detection plate 252 depresses the connection confirmation sensor 250 to deactivate the connection confirmation sensor 250. On the other hand, when the seat unit 110 is not in a proper position with respect to the lift-up mechanism 150, the positioning pins 165 are not inserted into the positioning holes 159a. Therefore, the detection plate 252 does not depress the connection confirmation sensor 250 to deactivate it.

Figure 30:
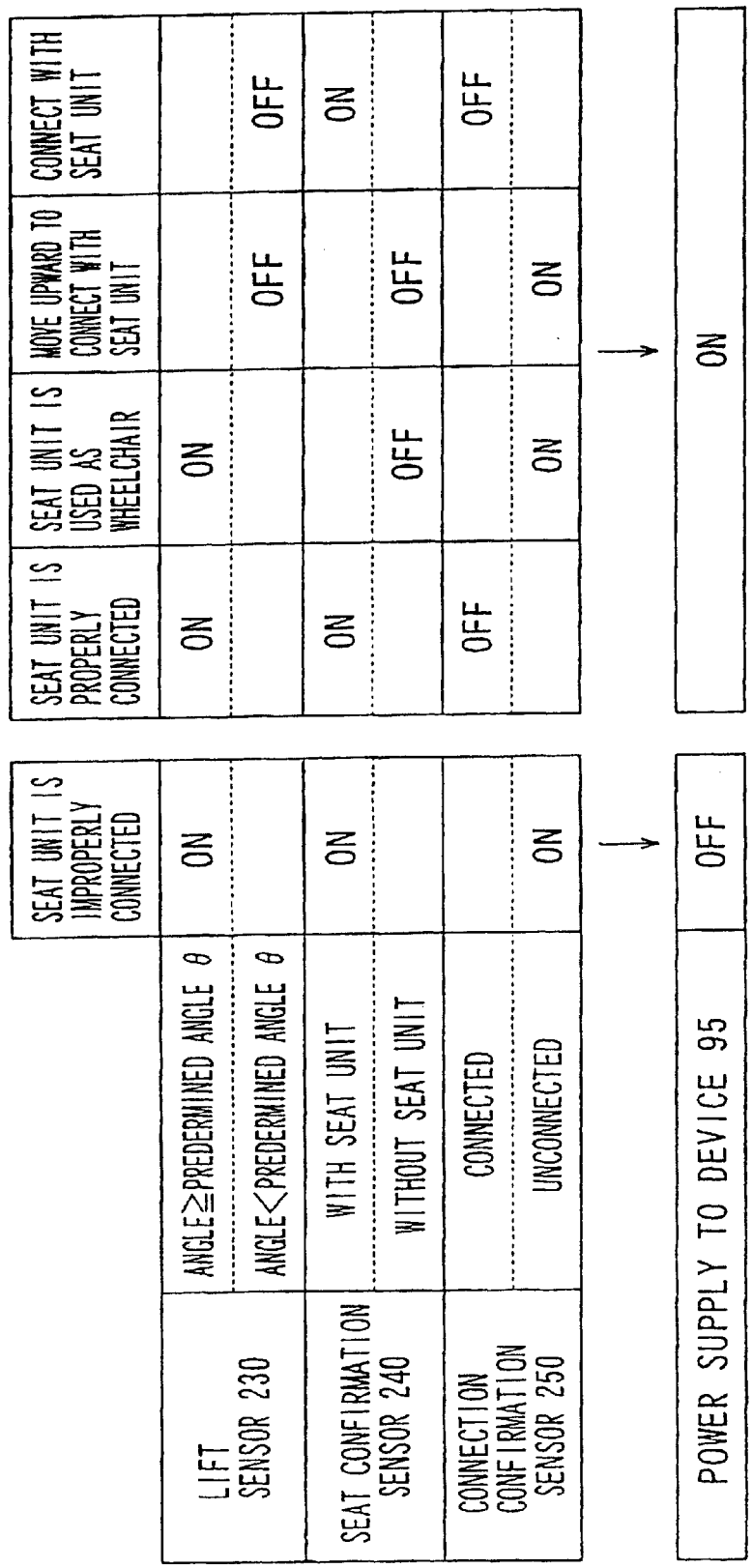
FIG. 30 is a diagram showing the on/off states of three sensors that can be used.

FIG. 30 depicts a chart of the various possible connection conditions of the seat unit with respect to the lift-up mechanism and the determination of whether the power supply to the motorized drive device is activated or deactivated based upon these combinations of the on/off states of the sensors 230, 240 and 250. Specifically, when all the sensors 230, 240 and 250 are on, the power supply to the motorized drive device 195, which acts as the drive source for the lift-up mechanism 150, is stopped. On the other hand, when any one of the sensors 230, 240 and 250 are off, power is supplied to the motorized drive device 195.

A representative operation for utilizing the representative seat connection confirmation mechanism follows. First, the lift-up mechanism 150, when it is detached from the seat unit 110, can be activated. The link arms 155a and 155b of the lift-up mechanism 150 rotate downward to position the connecting plates 156 in the lowermost position (in which the lift sensor is off). In this state, the seat unit 110 is set in a predetermined position with respect to the lift-up mechanism 150.

The lift-up mechanism 150 is then rotated toward the upright position. When the connecting plates 156 are properly connected to the connecting portions 140 of the seat unit 110 and the receiving frame 159 is superposed with the rear frame 124 of the seat frame 120, the connection confirmation sensor 250 is turned off. Further, when the seat unit 110 is connected in a proper position, the seat confirmation sensor 240 is turned on.

When the connection confirmation sensor 250 is turned off and the seat confirmation sensor 240 is turned on, the seat connection confirmation mechanism has confirmed that the seat unit 110 is properly connected to the lift-up mechanism 150. Therefore, in this state, even if the lift sensor 230 is turned on when the rear link arms 155b are rotated upward by a set angle θ, the motorized drive device 195 does not stop, so that the seat unit 110 can be moved into the vehicle compartment.

On the other hand, when the seat confirmation sensor 240 is turned on by confirming the existence of the seat unit 110 while the connection confirmation sensor 250 is not deactivated because the seat unit 110 is not properly connected to the lift-up mechanism 150, the lift sensor 230 is turned on at the instant when the rear link arms 155b are rotated upward by a set angle θ. In this case, the motorized drive device 195 stops, so that the lifting operation of the seat unit 110 stops. Therefore, the lift sensor 230 is preferably set to be activated at the time that the connecting plates 156 are raised to a predetermined height (e.g., the front and rear wheels 160 and 170 are slightly lifted above the ground).

With such a seat connection confirmation mechanism, when the existence of the seat unit 110 is confirmed, but the seat unit 110 is not properly connected to the lift-up mechanism 150, the lift-up mechanism 150 stops at the instant when the seat unit 110 is slightly lifted above the ground. Therefore, if the seat unit 110 that is not properly connected to the lift-up mechanism 150, the lifting operation can be prevented, so that the seat unit 110 is not unintentionally dropped. Further, by providing an alarm buzzer that provides a warning sound at the instant the motorized drive device 195 is deactivated, the passengers and their helpers can be informed of an improper connection of the seat unit 110 to the lift-up mechanism 150.

Figure 31:
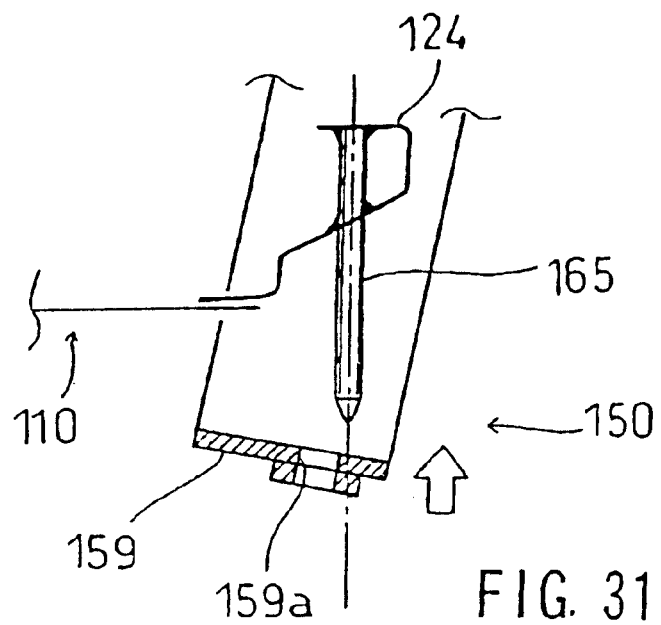
FIG. 31 is a side view showing the positional relation between a positioning pin and a positioning hole when the lift-up mechanism side is tilted with respect to the seat unit.

Further, an auxiliary positioning arrangement 260 also may be provided in order to ensure that the positioning pins 165 on the seat unit 110 are properly inserted into the positioning holes 159a of the lift-up mechanism 150. For example, if the lift-up mechanism 150 (on the vehicle side) is tilted with respect to the seat unit 110 because the vehicle is parked on an inclined road as shown in FIG. 31, the positioning holes 159a may not be aligned with the positioning pins 165. Even if the lift-up mechanism 150 is raised in this state, the positioning pins 165 will not be inserted into the positioning holes 159a, such that the seat unit 110 cannot be connected to the lift-up mechanism. However, by providing the auxiliary positioning arrangement 260, the positioning pins 165 can be reliably inserted into the positioning holes 159a.

Figure 32:
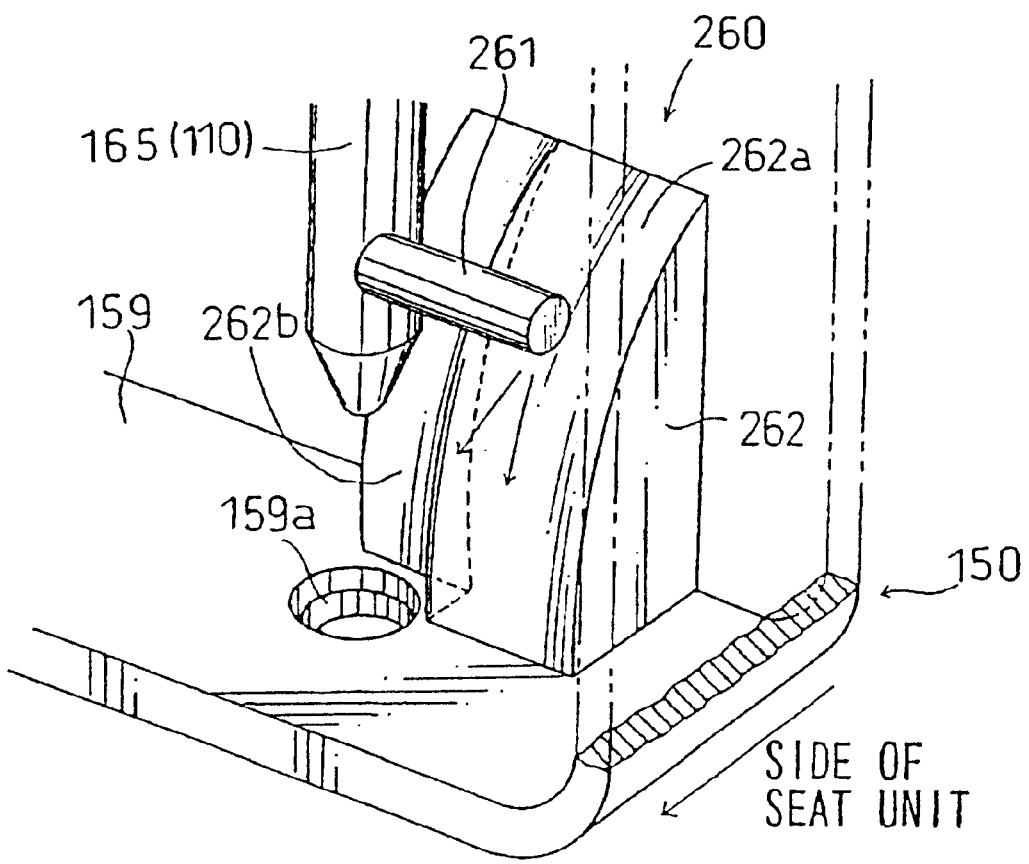
FIG. 32 is a perspective view of an auxiliary positioning arrangement.

As shown in FIG. 32, the representative auxiliary positioning arrangement 260 includes a control pin 261 mounted on the positioning pin 165 and a control block 262 mounted on the receiving frame 159 of the lift-up mechanism 150. The control pin 261 is an auxiliary positioning member, and is directly secured to and extends laterally from the positioning pin 165. The control block 262 is secured to the upper surface of the receiving frame 159 adjacent to the positioning hole 159a. The control block 262 has a wedge shape with a curved guide surface 262a and a stepped portion 262b. The guide surface 262a is an auxiliary positioning surface. The stepped portion 262b is provided such that the control block 262 can be disposed at a position closer to the positioning hole 159a without interfering with the positioning pin 165.

When using the auxiliary positioning arrangement 260, when the seat unit 110 is moved rearward toward the lift-up mechanism 150 in order to connect the seat unit 110 to the lift-up mechanism 150, the control pin 261 contacts the guide surface 262a of the control block 262. Subsequently, when the lift mechanisms 155 are rotated toward the upright position to move the connecting plates 156 upward, the connecting plates 156 are inserted into the connecting portions 140 of the seat unit 110. At the same time, as the receiving frame 159 moves upward, the control pin 261 slides down along the guide surface 262a. The guide surface 262a is inclined downwardly toward the seat unit 110, so that the control pin 261 and thus the positioning pin 165 move toward the positioning hole 159a while displacing to the side of the seat unit 110. Therefore, even if the lift-up mechanism 150 is located in a position lower than the seat unit 110 on inclined road surfaces and the positioning hole 159a is displaced to the side of the seat unit 110 and misaligned with respect to the tip of the positioning pin 165, the control pin 261 can cooperated with the guide surface 262a to correct the position of the positioning pin 165 to the side of the seat unit 110. Therefore, even on slopes, the positioning pin 165 can be reliably inserted into the positioning hole 159a, so that the seat unit 110 can be more reliably connected to the lift-up mechanism 150. Thus, the vehicle seat 101 can be used in a wider range of locations.

Various modifications, additions or deletions may be made to the auxiliary positioning arrangement 260. For example, although the auxiliary positioning surface (guide surface 262a) has been described as being curved, it may be flat and inclined. Specifically, instead of the control block 262, a flat plate may be secured in a leaning manner and the upper surface of the flat plate may be utilized as an auxiliary positioning surface (guide surface).

Further, although the control pin 261 was used as an auxiliary positioning member and was secured to the positioning pin 165, a roller or a block may be used instead of the control pin 261. Also, the auxiliary positioning member may be mounted on other portions than the positioning pin 165 (for example, on the underside of the rear frame 124).

What is claimed is:

1. A method of moving a seat unit from outside of a vehicle to inside of the vehicle, the seat unit being adapted to support a person and to be utilized as a wheelchair outside of the vehicle and as a seat inside of the vehicle, the seat unit having a pair of retractable front wheels with a rotational axis and a pair of retractable rear wheels with a rotational axis, the method comprising:
   coupling each of a plurality of horizontally spaced apart connecting recesses disposed on a backside of the seat unit to one of a plurality of connecting plates, each of said plurality of connecting plates movably disposed within the vehicle,
   moving the plurality of connecting plates to inside the vehicle in order to move the seat unit to inside the vehicle and rotate the seat unit approximately 90 degrees to face a front of the vehicle, and
   simultaneously retracting said front and said rear vehicle seat wheels from an operational position to a retracted position,
   wherein the rotational axes of the wheels are substantially aligned with a horizontal plane in the operational position and the rotational axes of the front wheels are substantially aligned with a vertical plane in the retracted position.

2. The method of claim 1,
   each of the seat unit front wheels mounted on a bracket, each said bracket including an engagement pin, the seat unit further comprising a frame having a plurality of stopper plates, and
   in which the step of simultaneously retracting said front and said rear wheels from said operational position to said retracted position includes each of said front wheel engagement pins contacting one of said plurality of stopper plates.

3. The method of claim 2,
   the seat unit further comprising:
   a plurality of front wheel stays, each of said plurality of front wheel stays pivotally connected to said frame, each of said front wheel stays further connected to one of said front wheel brackets,
   a front connecting rod connected to each of said front wheel stays, and
   a front wheel link arm pivotally connected to the front connecting rod, and
   in which the front wheels are simultaneously retracted by the front wheel link arm being simultaneously pivoted via the front connecting rod.

4. The method of claim 3,
   the seat unit further comprising:
   a plurality of rear wheel stays, each of said rear wheel stays connected to the frame, each of said rear wheel stays further connected to one of said rear wheels,
   a rear connecting rod connected to each of said rear wheel stays, and
   a rear wheel link arm pivotally connected to the rear connecting rod, and
   in which the rear wheels are simultaneously retracted by the rear wheel link arm being simultaneously pivoted via the rear connecting rod.

5. The method of claim 4,
   in which said front wheel link arm is pivotally connected to said rear wheel link arm, and
   in which the front wheels and the rear wheels are simultaneously retracted by a pivotal cooperation between said front wheel link arm and said connected rear wheel link arm.

6. The method of claim 5,
   in which said front wheel link arm is pivotally connected to said rear wheel link arm by a lock mechanism, and
   in which said lock mechanism is released from a locked state to an unlocked state before said front and said rear wheels are simultaneously retracted.

7. The method of claim 6,
   in which said lock mechanism comprises a lock arm biased toward a locking position, and
   in which said lock arm is released from said locking position before said front wheels and said rear wheels are simultaneously retracted.

8. The method of claim 2, in which moving the seat unit inside the vehicle includes lifting the seat unit.

9. The method of claim 8,
   in which the vehicle comprises a lift-up mechanism, and
   in which the seat unit is lifted by the lift-up mechanism.

10. The method of claim 9,
    in which the lift-up mechanism comprises a pair of link mechanisms, each of said link mechanisms attached to one of said plurality of connecting plates, and in which each of said plurality of connecting plates is coupled to one of said connecting recesses by vertically pivoting each said link mechanism.

11. The method of claim 10,
in which the lift-up mechanism further comprises a connecting shaft connected to each of said link mechanisms, and
in which each said link mechanism is simultaneously pivoted by rotating the connecting shaft.

12. The method of claim 11,
in which the lift-up mechanism further comprises a motorized drive device connected to the connecting shaft, and
in which the motorized drive device rotates the connecting shaft.

13. The method of claim 10,
in which the lift-up mechanism further comprises a main base, a rotary disc, and a swing base, the main base attached to a floor of the vehicle, the rotary disc pivotally attaching the main base and the swing base, and the swing base pivotally attached to each said link mechanism, and
in which the seat unit is moved inside the vehicle by pivoting the swing base on the main base via the rotary disc.

14. The method of claim 13,
in which the rotary disc comprises an outer ring and an inner ring, the outer ring fixed to the main base and the inner ring fixed to the swing base, and
in which the swing base is pivoted by rotating the inner ring relative to the outer ring.

15. The method of claim 1,
each of the rear wheels in mechanical communication with a rear wheel stay, each rear wheel stay a control guide mounted thereto, and
in which the step of simultaneously retracting said front and said rear wheels from the operational position to the retracted position includes each of said front wheels contacting one of said control guides.

16. The method of claim 1,
in which the seat unit comprises:
a seat frame,
a pair of front wheel stays, each said front wheel stay pivotably attached to the seat frame and in mechanical communication with one of said front wheels, and
a pair of rear wheel stays, each said rear wheel stay pivotally attached to the seat frame and to one of said rear wheels, and
in which simultaneously retracting said front and said rear wheels includes vertically pivoting said front wheel stays and said rear wheel stays.

17. The method of claim 16,
in which the seat unit further comprises a front connecting rod and a rear connecting rod, the front connecting rod connected to each of said front wheel stays, and the rear connecting rod connected to each of said rear wheel stays, and
in which the front wheels and rear wheels are pivoted by rotating the front connecting rod and the rear connecting rod.

18. The method of claim 17,
in which the seat unit further comprises a sliding frame slidably mounted to the seat frame,
a rear wheel link arm mechanically connecting the rear connecting rod to the sliding frame, and
a pair of front wheel link arms, each said front wheel link arm mechanically linking one of the front wheel stays to the sliding frame, and
in which the front and rear wheels are simultaneously retracted by sliding the sliding frame relative to the seat frame.

19. The method of claim 18,
in which the seat unit further comprises a threaded shaft threadably connected to the sliding frame, and
in which sliding the sliding frame includes rotating the threaded shaft.

20. The method of claim 19,
in which the seat unit further comprises a gear box connected to the threaded shaft, and
a motor connected to the gear box, and
in which the threaded shaft is rotated when the motor is rotated.

21. The method of claim 16,
in which the vehicle comprises a lift-up mechanism including a pair of joint link mechanisms, each of said joint link mechanisms attached to one of said connecting plates, and
in which the seat unit is lifted by rotating each said joint link mechanism.

22. The method of claim 21,
in which the lift-up mechanism further comprises a connecting shaft extending between the joint link mechanisms, and
in which the joint link mechanisms are rotated by rotating the connecting shaft.

23. The method of claim 22,
in which the lift-up mechanism further comprises a motorized drive device connected to the connecting shaft, and
in which the connecting shaft is rotated by the motorized drive device.

24. The method of claim 22,
in which the lift-up mechanism further comprises a main base, a rotary disc, and a swing base, the main base attached to a floor of the vehicle, the rotary disc pivotally connecting the main base to the swing base, and the swing base attached to the connecting shaft, and
in which the seat unit is moved inside to inside the vehicle by pivoting the swing base relative to the main base.

25. The method of claim 24,
in which the rotary disc comprises an inner ring fixed to the swing base and an outer ring fixed to the main base, and
in which the swing base is pivoted by rotating the inner ring relative to the outer ring.

26. The method of claim 1, in which the front wheels and the rear wheels are retracted by an electric motor.

27. The method of claim 1,
the seat unit further comprising an electric motor adapted to move the front wheels and the rear wheels from the operational position to the retracted position and a power connector electrically connected to the electric motor and receiving power from a power source disposed within the vehicle, and
in which the front wheels and rear wheels are moved from the operational position to the retracted position by the electric motor using power from the power source disposed within the vehicle via the power connector.

* * * * *